US012015215B2

(12) United States Patent
Hosseini-Fahraji et al.

(10) Patent No.: US 12,015,215 B2
(45) Date of Patent: Jun. 18, 2024

(54) WIDEBAND END-FED COAXIAL COLLINEAR ANTENNA

(71) Applicant: VIRGINIA TECH INTELLECTUAL PROPERTIES, INC., Blacksburg, VA (US)

(72) Inventors: Ali Hosseini-Fahraji, Blacksburg, VA (US); Majid Manteghi, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 183 days.

(21) Appl. No.: 17/607,513

(22) PCT Filed: Jul. 8, 2020

(86) PCT No.: PCT/US2020/041220
§ 371 (c)(1),
(2) Date: Oct. 29, 2021

(87) PCT Pub. No.: WO2021/007334
PCT Pub. Date: Jan. 14, 2021

(65) Prior Publication Data

US 2022/0216612 A1 Jul. 7, 2022

Related U.S. Application Data

(60) Provisional application No. 62/871,560, filed on Jul. 8, 2019.

(51) Int. Cl.
*H01Q 9/04* (2006.01)
*H01Q 1/36* (2006.01)
(Continued)

(52) U.S. Cl.
CPC ................. *H01Q 9/28* (2013.01); *H01Q 1/36* (2013.01); *H01Q 21/10* (2013.01)

(58) Field of Classification Search
CPC ............ H01Q 9/28; H01Q 1/36; H01Q 21/10; H01Q 21/08
(Continued)

(56) References Cited

U.S. PATENT DOCUMENTS 4,975,713 A 12/1990 Sheriff
5,995,059 A * 11/1999 Shoemaker ............ H01Q 21/28 343/790

(Continued)

OTHER PUBLICATIONS

International Search Report and Written Opinion for PCT/US2020/041220 dated Nov. 19, 2020.

(Continued)

*Primary Examiner* — Jean B Jeanglaude
(74) *Attorney, Agent, or Firm* — Perilla Knox & Hildebrandt LLP; Jason M. Perilla

(57) ABSTRACT

Coaxial collinear antenna examples are described. An example coaxial collinear antenna includes a first segment and a second segment of a coaxial cable. The second segment includes a second inner conductor and a second outer conductor. The first inner conductor of the first segment is coupled to the second outer conductor of the second segment. The first outer conductor of the first segment is coupled to the second inner conductor of the second segment. Further, a first wire mesh is attached to the first outer conductor of the first segment, and a second wire mesh is attached to the second outer conductor of the second segment. Additionally, the coaxial collinear antenna includes an end-fed port that is situated at a distal end of the coaxial collinear antenna.

19 Claims, 19 Drawing Sheets

(51) Int. Cl.
*H01Q 9/28* (2006.01)
*H01Q 21/10* (2006.01)

(58) Field of Classification Search
USPC .......................................................... 343/791
See application file for complete search history.

(56) References Cited

U.S. PATENT DOCUMENTS

| | | | | |
|---|---|---|---|---|
| 6,057,804 | A | 5/2000 | Kaegebein | |
| 6,650,301 | B1 * | 11/2003 | Zimmerman ............ | H01Q 9/26 343/803 |
| 8,228,257 | B2 | 7/2012 | Lalezari | |
| 8,552,918 | B2 | 10/2013 | Lee et al. | |
| 9,356,340 | B2 | 5/2016 | Nilsson | |
| 2004/0125038 | A1 | 7/2004 | Diximus et al. | |

OTHER PUBLICATIONS

Notaros et al., "Generalized CoCo Antennas," Corpus ID: 201652532, [retrieved on Sep. 7, 2020]. Retrieved from the Internet: URL: https://pdfs.semanticscholar.org/3d42e/e9ed204e06303de1b298657c615aef7fccf3.pdf?_ga=2.52967144.1758365316.1599512616-453701779.1598996768 pp. 1-19.

Yang "A Wideband Medium-Gain Vertically Polarized Omnidirectional Antenna Array," [retrieved on Sep. 7, 2020]. Retrieved from the Internet: URL: Progress In Electromagnetics Research M, vol. 74, 169-178, 2018. pp 1-10.

B. B. Balsley and W. L. Ecklund, "A portable coaxial collinear antenna," IEEE Transactions on Antennas and Propagation, vol. 20, No. 4, pp. 513-516, Jul. 1972.

B. M. Notaros, M. Djordjevic, and Z. Popovic, "Generalized CoCo antennas," in Proceedings of the 2006 Antenna Applications Symposium, Allerton Park, Monticello, IL, U.S.A, 2006.

H. A. Wheeler, "A vertical antenna made of transposed sections of coaxial cable," IRE International Convention Record, vol. 4, pp. 160-164, 1956.

K. Jean-Fu, "Analysis of linear coaxial antennas," IEEE Transactions on Antennas and Propagation, vol. 46, No. 5, pp. 636-642, May 1998.

Lagouu and L. Bertel, "A modular coaxial colinear antenna," in 1994 Sixth International Conference on HF Radio Systems and Techniques, Jul. 1994, pp. 234-238.

Sakitani and S. Egashira, "Analysis of coaxial collinear antenna: recurrence formula of voltages and admittances at couuections," IEEE Transactions on Antennas and Propagation, vol. 39, No. 1, pp. 15-20, Jan. 1991.

T. J. Judasz and B. B. Balsley, "Improved theoretical and experimental models for the coaxial colinear antenna," IEEE Transactions on Antennas and Propagation, vol. 37, No. 3, pp. 289-296, Mar. 1989.

T. J. Judsaz, W. L. Eckluud, and B. B. Balsley, "The coaxial colinear antenna: current distribution from the cylindrical antenna equation," IEEE Transactions on Antennas and Propagation, vol. 35, No. 3, pp. 327-331, Mar. 1987.

* cited by examiner

WIDEBAND END-FED COAXIAL COLLINEAR ANTENNA

CROSS-REFERENCE TO RELATED APPLICATIONS

This application claims the benefit of, and priority to, co-pending, PCT Application No. PCT/US2020/041220, entitled "Wideband End-Fed Coaxial Collinear Antenna," filed on Jul. 8, 2020, which claims the benefit of, and priority to U.S. Provisional Patent Application No. 62/871,560, entitled "Wideband End-Fed Coaxial Collinear Antenna," filed on Jul. 8, 2019, which is incorporated herein by reference in its entirety.

BACKGROUND

Omnidirectional antennas with the best performance in terms of gain and bandwidth are increasingly in demand due to the rapid development of wireless communication and sensing systems. The ideal omnidirectional antenna should be broadband and high-gain with minimum gain variation, high efficiency, low weight, low cost, easy to fabricate, and portable for many applications. In addition, most communication systems may require the vertical-polarization antennas that concentrate the transmitted power at low heights above the ground or water in all horizontal directions, which require a wideband omnidirectional antenna with a fixed beam over the operating frequency range. In other words, the stability of the radiation-pattern peak can be vital. Designing an omnidirectional antenna that satisfies all of the preceding characteristics, however, is a significant challenge.

SUMMARY

Embodiments of the present disclosure are related to a wideband high-gain coaxial collinear antenna with a stable radiation pattern.

According one embodiment, among others, a coaxial collinear antenna is provided comprising a first segment and a second segment of a coaxial cable for a coaxial collinear antenna. The first segment comprises a first inner conductor and a first outer conductor. The second segment comprises a second inner conductor and a second outer conductor. The first inner conductor of the first segment is electrically coupled to the second outer conductor of the second segment, and the first outer conductor of the first segment is electrically coupled to the second inner conductor of the second segment. The coaxial collinear antenna can comprise a first wire mesh that is attached to the first outer conductor of the first segment and a second wire mesh that is attached to the second outer conductor of the second segment. Also, the coaxial collinear antenna can include an end-fed port situated at a distal end of the coaxial collinear antenna.

In various embodiments, the coaxial collinear antenna can at least one of the first wire mesh and the second wire mesh comprises a plurality of rods. Also, the various embodiments can further comprise an electrically-conductive cable inserted through the end-fed port and through one segment of the coaxial cable. In some embodiments, the electrically conductive cable can have a smaller diameter than the coaxial cable. Additionally, the electrically conductive cable can be coupled to an impedance matching circuit.

In various embodiments, the coaxial collinear antenna can include an impedance matching circuit that connects to the electrically conductive cable. The impedance matching circuit can be coupled to a respective inner conductor and a respective outer conductor of one segment of the coaxial cable.

In various embodiments, the first wire mesh comprises a first rod that is attached to the first outer conductor of the first segment and a second rod that is attached to the first outer conductor of the first segment. Additionally, the first rod and the second rod are diametrically opposite about the first outer conductor of the first segment. Further, a length of the first rod can be determined based at least in part on half of an operating wavelength of the coaxial collinear antenna.

In various embodiments, the first wire mesh can include a first rod that is attached to the first outer conductor of the first segment and a second rod that is attached to the first outer conductor of the first segment. The first wire mesh can also include a third rod that are attached to the first outer conductor of the first segment and a fourth rod that is attached to the first outer conductor of the first segment.

In various embodiments, the end-fed port is located in a respective segment of the coaxial cable at a distance of a quarter-wavelength from an interconnection with a preceding segment. Also, the coaxial collinear antenna can include an electrically-conductive cable that is inserted through an interior of one segment and routed outside of the preceding segment of the coaxial cable. The preceding segment can have a length of a half-wavelength.

In various embodiments, the distal end represents a first distal end for the end-fed port, and the coaxial collinear antenna further comprises a last segment of the coaxial cable short-circuited at a second distal end of the coaxial collinear antenna.

In various embodiments, the first wire mesh for the first segment comprises a first pair of rods and the second wire mesh of the second segment comprises a second pair of rods, wherein the first pair rods and the second pair of rods are aligned along a longitudinal axis of the coaxial collinear antenna.

According to another embodiment, among others, a coaxial collinear antenna is provided comprises a first segment, a second segment, and other segments of a coaxial collinear antenna. The first segment can comprise a first inner conductor and a first outer conductor. The second segment can comprise a second inner conductor and a second outer conductor. The first inner conductor of the first segment can be electrically coupled to the second outer conductor of the second segment. The first outer conductor of the first segment can be electrically coupled to the second inner conductor of the second segment.

The coaxial collinear antenna can also include a first wire mesh, a second wire mesh, an end-fed port, and an electrically conductive cable. The first wire mesh can be attached to the first outer conductor of the first segment. The first wire mesh can comprise a first plurality of rods. The second wire mesh can be attached to the second outer conductor of the second segment. The second wire mesh can comprise a second plurality of rods. The end-fed port can be situated in the particular segment of the coaxial cable. The particular segment can be located at a distal end of the coaxial cable. Additionally, the electrically conductive cable can be inserted through the end-fed port and into the interior of the third segment.

In various embodiments, the electrically conductive cable is coupled to an impedance matching circuit. At least one of the first plurality of rods or the second plurality of rods can include a bend. Also, the first plurality of rods can be coupled to the first outer conductor of the first segment of the coaxial cable. Additionally, the electrically conductive cable can have a smaller diameter than the coaxial cable.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
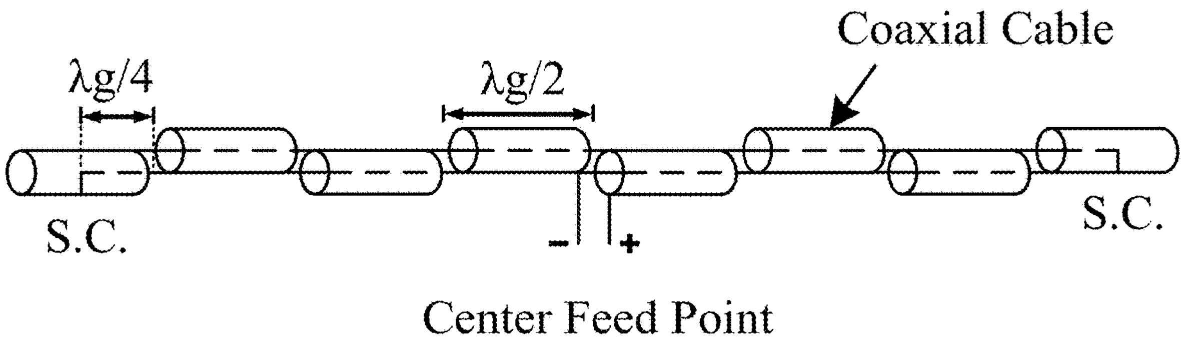
FIG. 1 is a drawing of a coaxial collinear antenna with a center feed point, according to one embodiment described herein.

The present disclosure relates to a wideband high-gain coaxial collinear antenna with a stable radiation pattern. Based in part on the fat dipole idea, a configuration of the classical center-fed coaxial collinear antenna can be modified in order to construct various embodiments of a wideband end-fed coaxial collinear antenna, as described herein. For example, the embodiments of the present disclosure can include a wire mesh Coaxial Collinear (CoCo) antenna that increases the bandwidth of the antenna while maintaining a stable gain and radiation pattern over a wide frequency band. In one non-limiting example, a −10 dB impedance bandwidth and the gain bandwidth (1 dB variation of the maximum gain versus frequency) of the wideband CoCo antenna of the embodiments at a center frequency of 470 and 900 MHz was achieved, which is three times more than the corresponding bandwidth of the classical center-fed CoCo, while it maintains 9 dB gain. A prototype antenna at 900 MHz was implemented, and the simulation results were confirmed.

A collinear dipole array with an omnidirectional radiation pattern has been a priority candidate for mobile communications. Based on the concept of the Franklin antenna, the CoCo antenna was introduced in 1956. The CoCo antenna has been developed theoretically and experimentally over the years, as an appropriate choice for a high-gain omnidirectional antenna, particularly in VHF/UHF bands due to its simple mechanism of feeding and its ease of manufacturing. The CoCo antenna has been used as an isolated antenna element and in large arrays, for atmospheric and ionospheric radar as well as for commercial communication purposes. CoCo antennas have the gain of more than 10 dBi. However, as a series-fed antenna array, the basic CoCo antenna suffers from narrow bandwidth and frequency dependent radiation patterns (e.g., beam scan pattern).

In the 1980's, early microstrip versions of the collinear antenna arrays were developed. Later, the omnidirectional planar microstrip antenna was developed in 2004. Over the past decade, the different types of planar collinear antennas have been proposed to increase the gain and bandwidth. However, the typical gain for these implementations has been around 5-6 dBi, with approximately 20% impedance bandwidth. Moreover, they suffer from beam scanning over bandwidth due to serial feeding. In one implementation, a three-element array was developed in which each element comprised two driven planar dipoles and two parasitic dipoles. The antenna could realize omnidirectional radiation patterns over a wide frequency band (56.4% impedance bandwidth) with a gain of around 7 dBi and a gain variation less than 1.5 dB. But, the design was parallel-fed instead of series-fed, had a large longitudinal size, and had a complicated structure.

Besides collinear type antennas, wideband single-element antennas, such as bow-tie or biconical antennas, have relatively low gain. There are few examples of conical arrays capable of broader bandwidth with higher gain. However, previous proposed feed networks have caused distortion of the omnidirectional pattern, suffer from beam scanning, need a complicated fabrication process, or are not applicable to an array with more elements. Also, planar slot arrays can reach a gain of 10 dBi, but the bandwidth is only 4.6%.

In another implementation, a self-sustaining maritime mesh network was designed to provide ocean wireless connectivity. In the first prototype, a sleeve dipole antenna was mounted on a buoy as a proper choice due to its light-weight and simple structure considering the environmental factors. In the next phase, a wideband omnidirectional antenna with a narrower beam (9 dBi gain) can be used to improve the communication range and capacity in the rich multipath channel on the ocean.

A desired antenna may be light-weight, low-cost, and have a simple end-fed structure. These features can able the antenna to be capable of mounting on a buoy, while it has a 9 dBi stable omnidirectional beam over the wide bandwidth. Typically, the quality of the impedance matching can be used to determine the bandwidth of narrowband antennas. However, the stability of radiation patterns can be factored in the bandwidth improvement described. In some embodiments, the wideband antenna design can take into account both the radiation pattern and the impedance match. The planar collinear arrays are not a suitable design for some antenna designs because of low gain or beam scanning due to serial feeding. Although the CoCo antenna provides a narrow omnidirectional beam and its gain increases by increasing the number of elements, which is suitable for 9 dBi gain narrow beam, its impedance bandwidth decreases by increasing its gain, and it has a beamscan radiation patterns that limit its functionality to narrowband applications.

The embodiments of the present disclosure relate to an improved coaxial collinear antenna based on the idea of a fat dipole. The embodiments of the present disclosure significantly increase the bandwidth. At first, a series of center-fed CoCo antennas were designed to prove the concept of increasing bandwidth, while maintaining a stable radiation pattern. Then, an end-feed network was added to the embodiments of the antenna to create a wideband fixed beam end-fed CoCo antenna. In the context of the present disclosure, wideband can refer to a bandwidth significantly exceeding the coherence bandwidth of a classical coaxial collinear antenna.

The embodiments of the antenna can benefit from the favorable features of the classical center-fed CoCo antenna, such as the high-gain omnidirectional beam, low-weight, and ease in fabrication. Additionally, while attempting to improve the bandwidth as much as possible by using the fat dipole concept, the embodiments can be designed using a feeding network to omit beam scanning with minimal complexity, to achieve a reasonable trade-off between all the required characteristics of the antenna.

Turning to the drawings, FIG. 1 shows a classical coaxial collinear antenna with a center feed point. As illustrated in FIG. 1, the inner and outer conductors of a first segment of the antenna are connected, respectively, to the outer and inner conductors of a second segment of the antenna. The last segment is short-circuited at a distance of about quarter-wavelength from the interconnection with the preceding segment. The short-circuit can include connecting the inner conductor to the outer conductor for a particular segment of the coaxial cable. This configuration can force the phase of the current distribution to remain approximately constant on the outer conductor.

There are other versions of CoCo antennas that use a junction box, a coupled connection, or a slotted connection between sections, but all keep the phase of the current distribution constant on radiator sections. Electrically interchanging of the inner and outer conductors at each segment produce identical and opposite phase currents in the inner line conductor and on the inside surface of the outer line conductor, as radiating currents. The source generator can excite two antennas, first the outer line conductor and second the inner line conductor, which are fed 180 degrees out of phase. In this example, the source generator can excite the two antennas through the end-fed point. Therefore, there can be a non-zero total current along the coaxial sections as a radiating current.

Figure 2A:
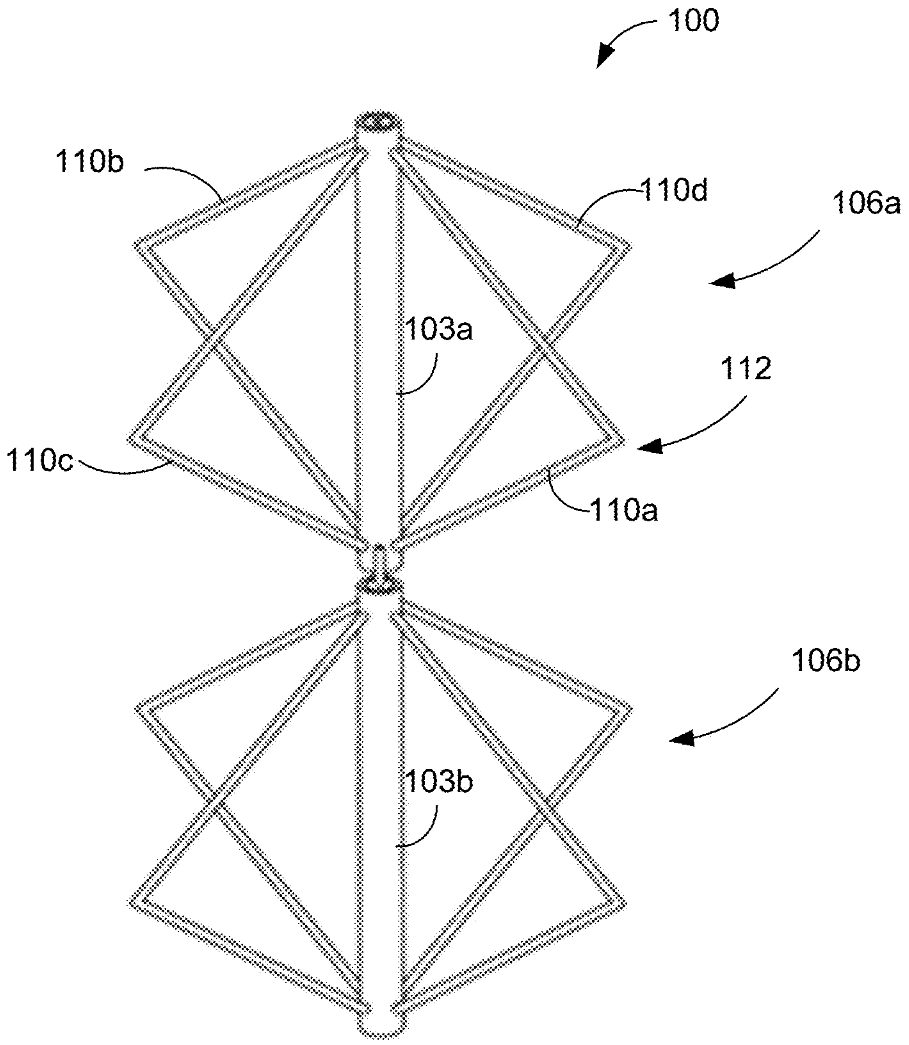
FIGS. 2A and 2B are drawings of two segments of a wideband coaxial collinear antenna according to one embodiment described herein.
Figure 2B:
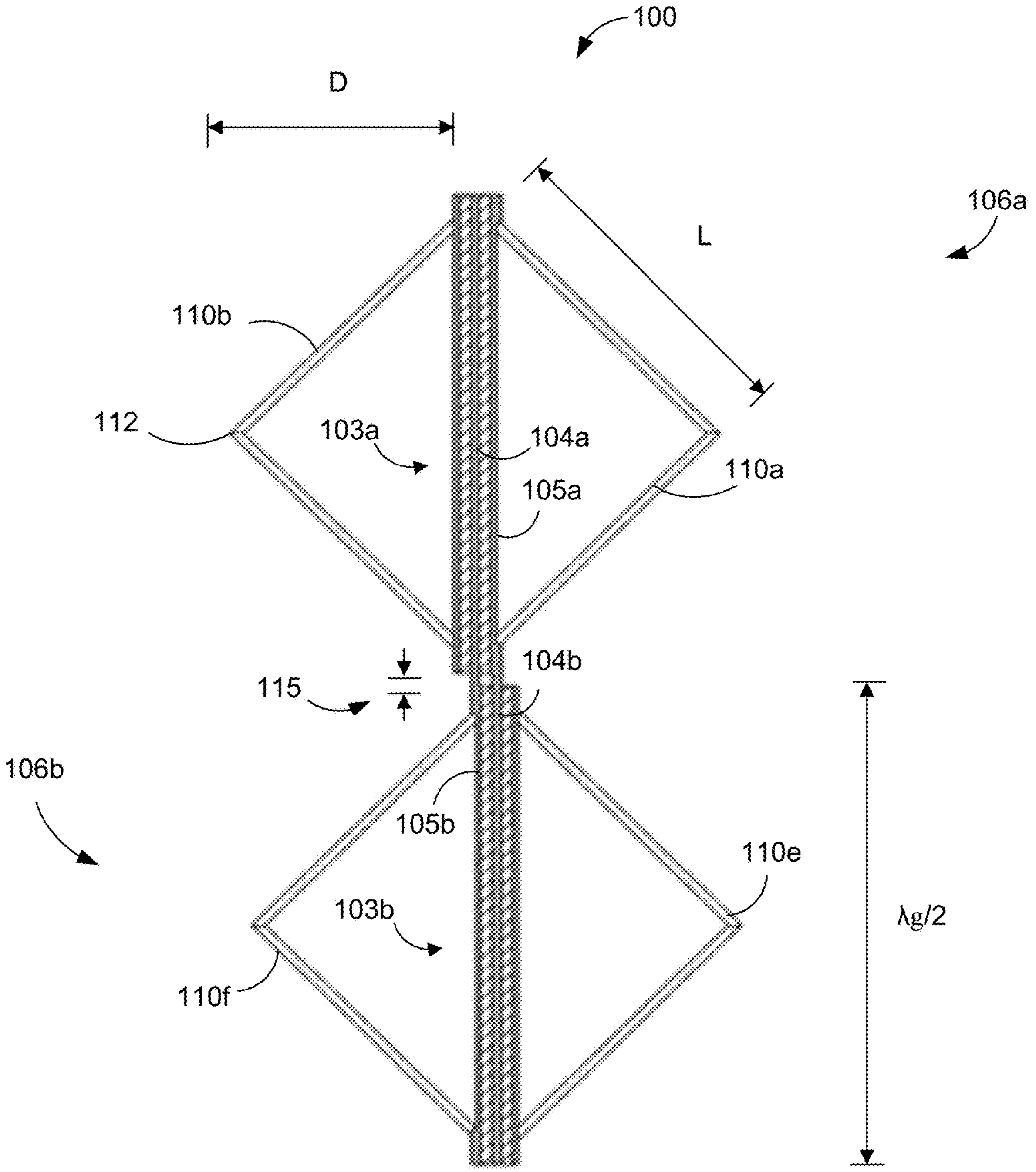

As illustrated in FIGS. 2A and 2B, two segments of the exemplary embodiment of a wideband CoCo antenna 100 are shown. FIG. 2A illustrates a perspective view of a first segment 103*a* and a second segment 103*b* of the wideband CoCo antenna 100. FIG. 2B illustrates a cross-sectional view of the wideband CoCo antenna 100 from FIG. 2A. FIG. 2B also illustrates that a first inner conductor 104*a* of the first segment 103*a* is coupled to a second outer conductor 105*b* of the second segment 103*b*. The first outer conductor 105*a* of the first segment 103*a* is coupled to the second inner conductor 104*b* of the second segment 103*b*.

Traditionally, a dipole thickness has been increased as a fat dipole to increase the frequency bandwidth of the dipole. In addition, a wire mesh surrounding a dipole has demonstrated similar properties as a fat dipole. To mimic a fat dipole, a wire mesh cage or structure can be added to the outer cylinder of the coaxial cable, while the length (2 L) of each rod in the wire mesh structure can be around the half-wavelength in order to keep the current similar to the classical CoCo antenna. FIG. 2A illustrates that the first segment 103*a* of the coaxial cable includes a first wire mesh 106*a* and the second segment 103*b* of the coaxial cable includes a second wire mesh 106*b* (collectively "the wire mesh structures 106"). In some embodiments, the wideband CoCo antenna can have an operating wavelength in a range between 10 cm and 30 m, which can correspond to an operating frequency range 10 MHz and few gigahertz. It should be noted that this operating range is one non-limiting example among other possible operating ranges.

The wire mesh structures 106 can comprise a set of rods 109 that are attached to a particular segment of the coaxial cable. The wire mesh structure 106 can be constructed from metal, copper, aluminum, brass, and other suitable materials. For example, as illustrated in FIG. 2A, the first segment 103*a* of the coaxial cable includes a first end and a second end. The first wire mesh 106*a* includes four different rods 110*a*-110*d* for the first segment 103*a* and the second segment 103*b* can include other rods (110*e*, 110*f*) (collectively "the rods 110"), as illustrated in FIG. 2A and FIG. 2B as a non-limiting example. Each rod 110 can also have a first end that is connected to the first end of the segment 103 and a second end of the rod 110 can be connected to the second end of the segment 103. In the illustrated embodiment, each rod 110 can be a single continuous structure.

In the illustrated embodiment, the rods 110 have a bend 112 at approximately a middle point of each of the rods 110. In other examples, the bend 112 can be located at a different point along the rod 110.

As shown in FIG. 2B, the bend 112 in the rods 110 can be considered as an outer most point 112 for the first wire mesh 106*a*. FIG. 2B illustrates that D represents a distance from the bend 112, or the outer connection point, to the outer surface of the first segment 103*a* of the coaxial cable. FIG. 2B also illustrates that the first rod 110*a* is diametrically opposite to the second rod 110*b* about the first segment 103*a*. In other embodiments, the rods 110 can be configured in various arrangements surrounding the segments 103 of the coaxial cable. Additionally, in some embodiments, the first rod 110*a* can be aligned with a fifth rod 110*e* along a longitudinal axis or a length of the coaxial collinear antenna. For example, as illustrated in FIG. 2B, the first rod 110*a*, the second rod 110*b*, the fifth rod 110*e*, and the sixth rod 110*f* are in the same vertical plane along the longitudinal axis of the coaxial collinear antenna. Thus, the rods 110*e*, 110*f* in the second segment 103*b* can be aligned with the rods 110*a*, 110*b* in the first segment 103*a*.

As shown in FIG. 2B, the first rod 110*a* is attached to the first outer conductor of the first segment 103*a* and the second rod 110*b* is attached to the first outer conductor of the first segment 103*a*. A length 2 L of any one of the rods 110 can be determined based at least in part on half of an operating wavelength of the wideband CoCo antenna 100.

Although FIG. 2B illustrates four rods 110 attached to the first segment 103*a* and four rods 110 attached to the second segment 103*b*, it should be appreciated that the number of rods 110 can be vary. In some contexts, the four rods 110 can be considered as four bent rods. Additionally, FIG. 2B illustrates a gap reference 115 between two consecutive segments 103, which is the first segment 103*a* and the second segment 103*b* in FIG. 2A and FIG. 2B.

In other non-limiting example, a pair of sub-rods may replace the rod 110*a*. For example, a first sub-rod and a second sub-rod may replace rod 110*a*. The first sub-rod can be connected to the second sub-rod at a first end and the first sub-rod can be connected to an end of the first segment 103. Thus, instead of having a bend point 112, the pair of sub-rods can have a connection point. In this example, the length of each sub-rod can be length L.

To evaluate the effectiveness of the embodiments of the antenna structure to increase the antenna bandwidth, the characteristics of one embodiment of a wideband CoCo antenna 100 was compared with a classical CoCo antenna (FIG. 1). This evaluation was done for three different schemes, with the goal of designing a 9 dBi gain wideband CoCo antenna 100. First and second schemes were dedicated to the design of center-fed antennas to show improvements in bandwidth, taking into account both impedance bandwidth and stability of the radiation pattern. The antennas were designed with a center frequency of around 470 MHz for TV white space band. Then, in the third scheme, an end-fed port was designed and added to the wideband CoCo antenna 100 in order to address our buoy mounting goal. The results were compared with 470-MHz center-fed CoCo at the second scheme, though the end-fed prototype antenna is manufactured for 900 MHz, owing to measurement considerations.

All classical and wideband models were simulated using ANSYS HFSS®. In the first design scheme, the classical center-fed CoCo antenna, FIG. 1, includes eight sections of air-filled coaxial cable with radii of the inner and outer conductors as 3 mm and 10 mm, respectively. Four bent rods were connected to each of the outer conductors for the prototype antenna of the wideband CoCo antenna 100, whereas D is 70 mm and other dimensions were maintained (FIG. 2) as the classical center-fed antenna. For the use of polyethylene dielectric coaxial cables such as RG-218 or RG8A/U, the length of each section is equal to half the guided wavelength, so that the length of rods (2 L) in wire mesh cage should be approximately half the free space wavelength to keep the phase of current distribution constant on the outer conductor.

In the second scheme, a twelve-section classical center-fed antenna with RG8A/U coaxial cable dimensions was designed. Four bended rods were connected to each of the outer conductors for the center-fed CoCo antenna, while D increases to 140 mm and other dimensions are kept as the classical center-fed CoCo made from RG8A/U. By using a RG8A/U coaxial cable, it helped to improve the bandwidth compared with air-filled coaxial cable.

Figure 3A:
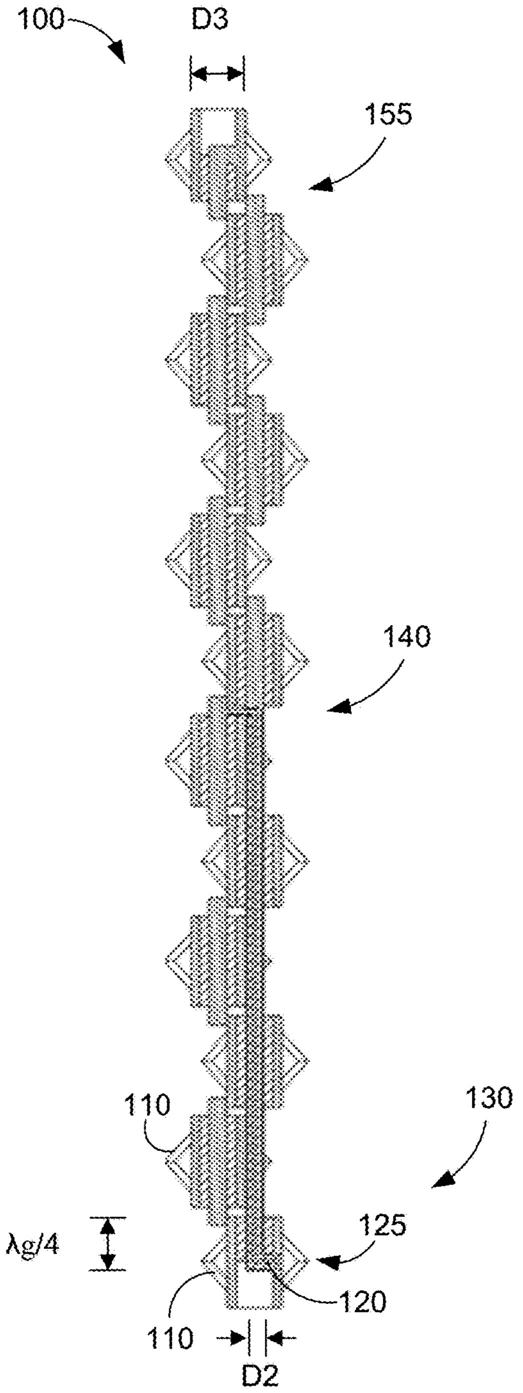
FIGS. 3A and 3B are drawings of a wideband coaxial collinear antenna with an end-fed point, according to one embodiment described herein.
Figure 3B:
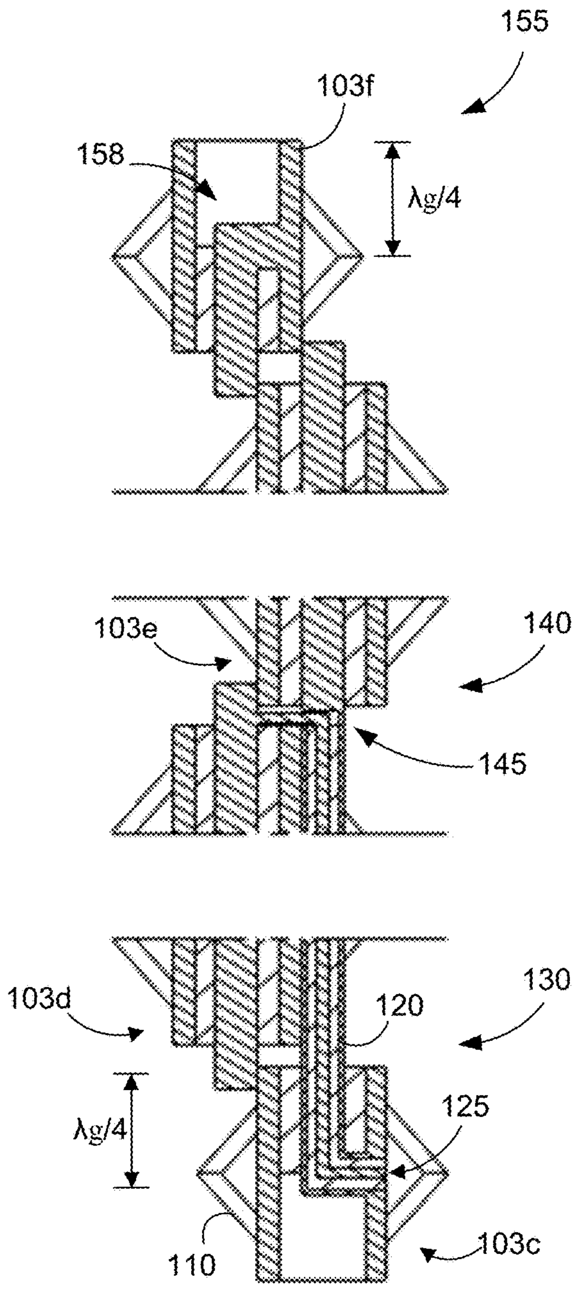

Moving on to FIGS. 3A and 3B, shown are different aspects of a twelve-section wideband CoCo antenna 100 with an end-fed port. In this embodiment, the wideband end-fed CoCo antenna 100 includes an electrically conductive cable 120 threaded in and out a lower portion of the wideband end-fed CoCo antenna 100. Specifically, FIG. 3A illustrates a cross-sectional view of the wideband end-fed CoCo antenna 100. FIG. 3B illustrates an enlarged view of certain portions of the wideband end-fed CoCo antenna 100 shown in FIG. 3A. It should be noted that the electrically conductive cable 120 can also be considered as a semi-rigid cable. In this embodiment, the electrically conductive cable 120 has a diameter D2 that is less than a diameter D3 of the segments 103 of the coaxial cable.

In the lower part of the wideband CoCo antenna 100, the semi-rigid cable replaces the inner conductor of the main coaxial cable. Particularly, the semi-rigid cable is inserted through an end-fed port 125 situated at a distal end of the coaxial cable. Reference number 130 illustrates an enlarged view of the end-fed port 125 at the distal end of the wideband end-fed CoCo antenna 100. The end-fed port 125 can be located at a distance of a quarter-wavelength from an interconnection with a preceding segment, as illustrated in FIG. 3B. The end-fed port 125 can comprise an opening in the outer conductor of the particular segment 103*c* of the wideband end-fed CoCo antenna 100. As a result, the semi-rigid cable can be inserted through to an interior of the respective the particular segment 103*c* and routed outside of the preceding segment (103*d*) of the coaxial cable, as illustrated in FIG. 3. In other words, the semi-rigid cable alternates between being routed into the interior of the particular segment 103*c* and routed outside of the following segment 103*d* of the wideband end-fed CoCo antenna 100. The semi-rigid cable is coupled to each of these portions of the segments.

The semi-rigid cable can help bring the excitation point to the center of the antenna to omit beamscan radiation pattern while minimizing the effect on the omnidirectional pattern and antenna performance compared to the center-fed antenna. Indeed, by viewing the entire semi-rigid as a single conductor, the semi-rigid cable has similar functionality to the inner conductor of the main coaxial cable, and the core of the semi-rigid cable brings the excitation point to the desired position.

Next, reference number 140 illustrates an enlarged view of a middle portion of the wideband end-fed CoCo antenna 100. In some embodiments, the semi-rigid cable can be electrically coupled to an impedance matching circuit 145, which in turn is coupled to an inner conductor and an outer conductor of the following segment 103*e* of the coaxial cable. In some cases, the impedance matching circuit 145 can comprise a quarter-wavelength coaxial transformer and other suitable transformers.

Further, reference number 155 illustrates an enlarged view of a second distal end of the wideband end-fed CoCo antenna 100, which is opposite to a first distal end that includes the end-fed port 125. Reference number 155 illustrates an enlarged view of a short-circuit 158 at about a quarter wavelength from the end of the segment 103*f*. In this embodiment, the short-circuit 158 comprises connecting the inner conductor of the segment 103*f* to the outer conductor of the segment 103*f*.

Next, a discussion of the executed simulations and results is provided. In order to design an exemplary embodiment of the wideband end-fed CoCo antenna 100 with desired characteristics, the simulation results are presented step by step, and compared to the classical CoCo antenna in order to assess the effectiveness of each step. In these non-limiting examples, all antennas have a gain of about 9 dBi at the center frequency around 470 MHz with a total length of 2.5 m.

First, an eight-section center-fed CoCo antenna was simulated. In the first scheme, an eight-section classical and a wideband center-fed CoCo antennas made of air-filled coaxial cables was simulated. In this simulation, the wideband center-fed was employed as one exemplary embodiment among others. The simulation results show that the input impedance of the eight-section classical center-fed CoCo at its resonant frequency is about 121.8Ω, while the simulated input impedance of the wideband center-fed antenna is approximately 42.7Ω. The input impedance can be reduced by adding a wire mesh structure to the conventional configuration. In order to effectively compare the bandwidth, a 120Ω port has been used in the simulation for the classical center-fed CoCo instead of regular 50Ω port to avoid the circuit matching and this enables a more straightforward comparison.

Figure 4:
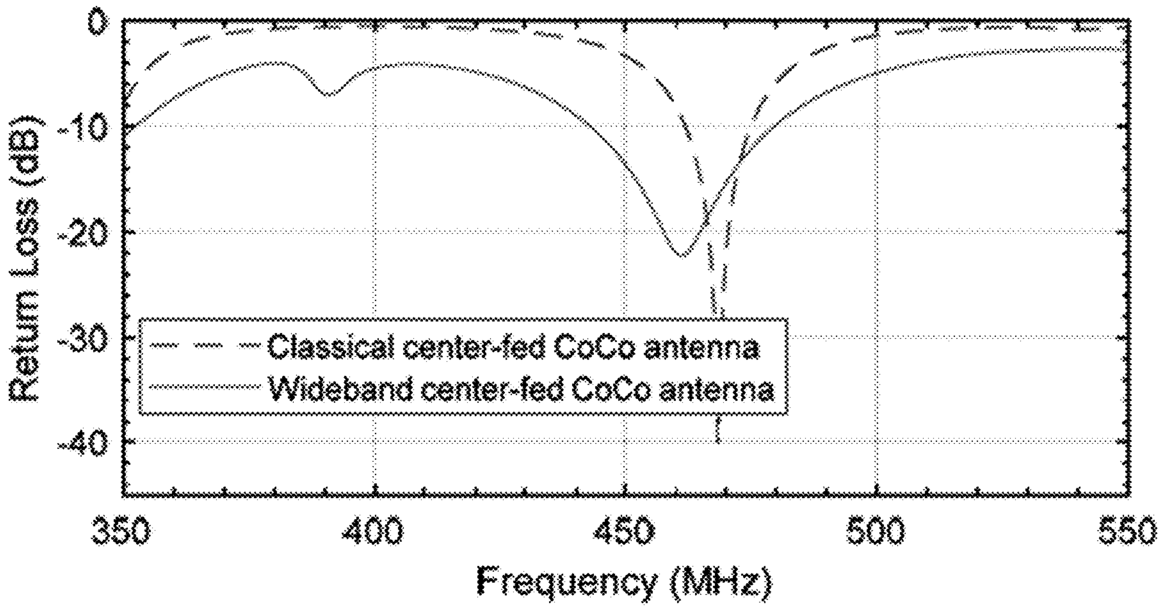
FIG. 4 is a graph of a return loss of an eight-section classical coaxial collinear antenna and a wideband center-fed coaxial collinear antenna, according to one embodiment described herein.

Note that the impedance bandwidth can be calculated using the appropriate port and normalization for center-fed design procedures, to ideally evaluate the capability of the proposed configuration. While considering the effects of all involved parameters including matching circuits, a practical comparison is made between these ideal center-fed assessments and the embodiments of the end-fed design. FIG. 4 shows the computed return loss for both eight-section classical and the wideband center-fed CoCo antennas. The impedance bandwidth (s11<−10 dB) of the classical center-fed CoCo antenna is 2.8%, while computed bandwidth of the end-fed design antenna of the embodiments is 7.9% (442.8-479.5 MHz), which indicates approximately three times broader bandwidth.

Figure 5:
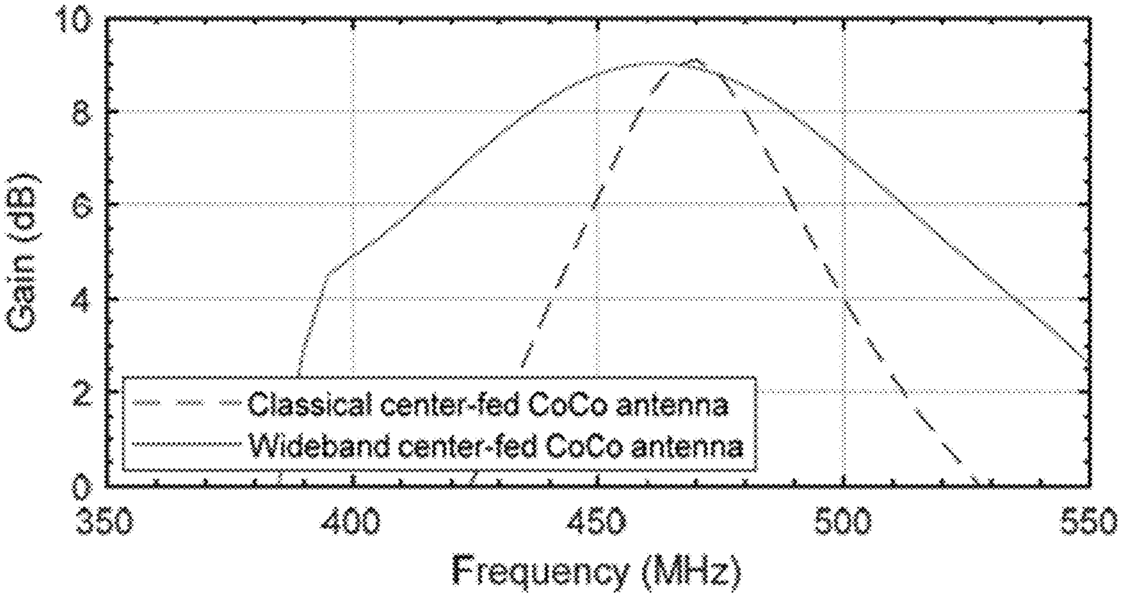
FIG. 5 is a graph of gain as a function of frequency for an eight-section classical coaxial collinear antenna and a wideband center-fed coaxial collinear antenna, according to one embodiment described herein.
Figure 6A:
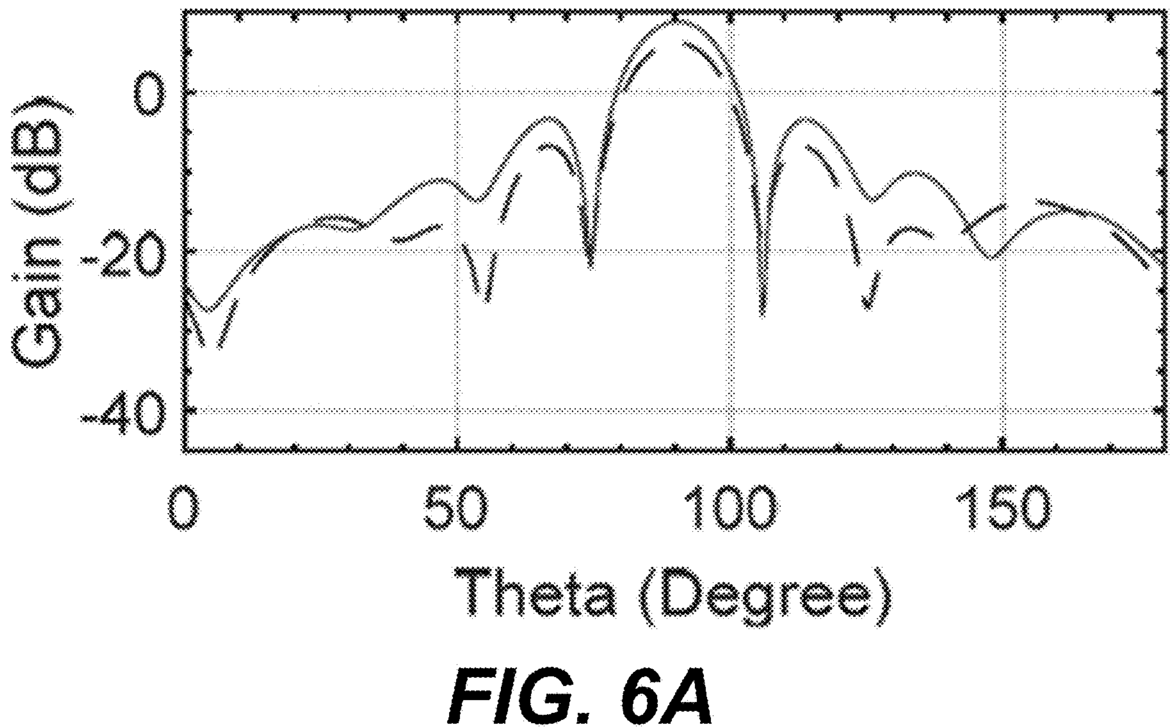
FIGS. 6A-6D are graphs of radiation patterns of the eight-section classical coaxial collinear antenna and the wideband center-fed coaxial collinear antenna as a function of theta, according to one embodiment described herein.
Figure 6B:
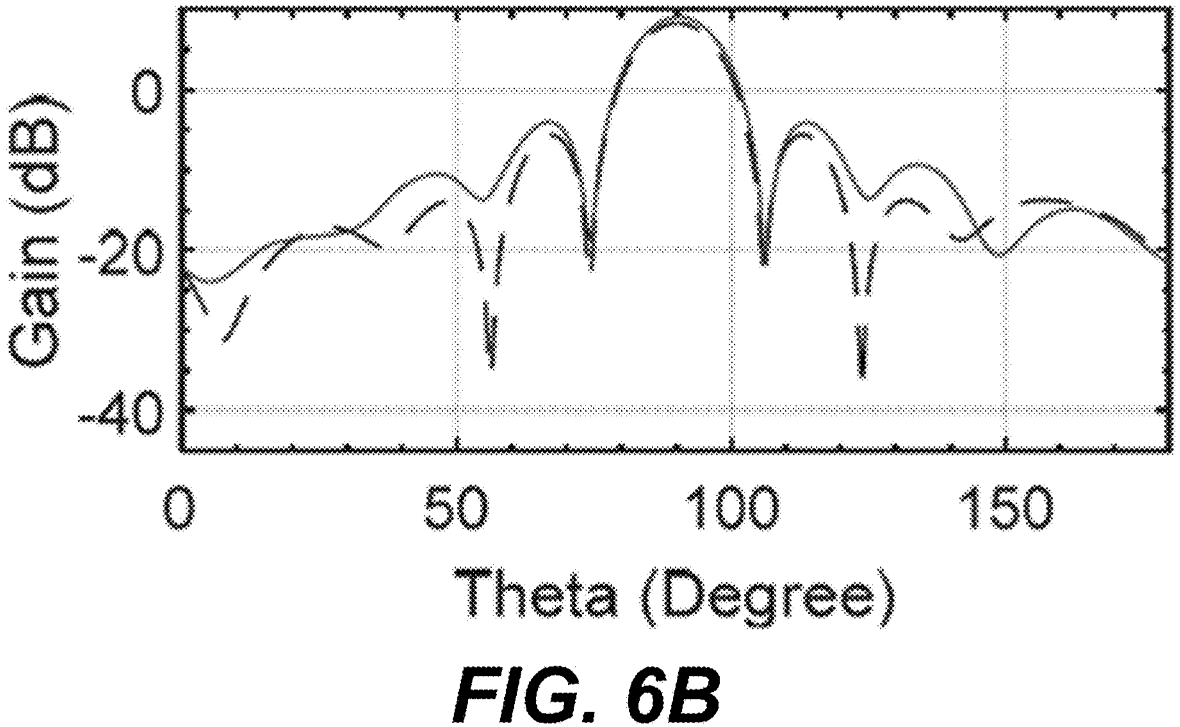
Figure 6C:
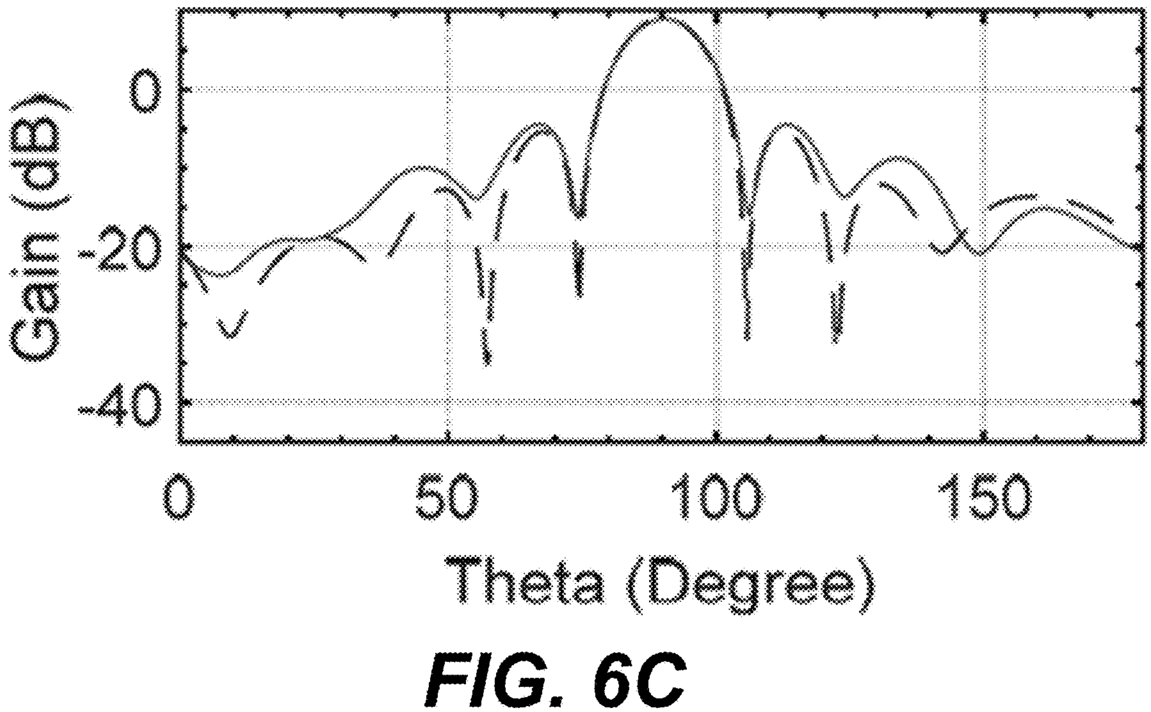
Figure 6D:
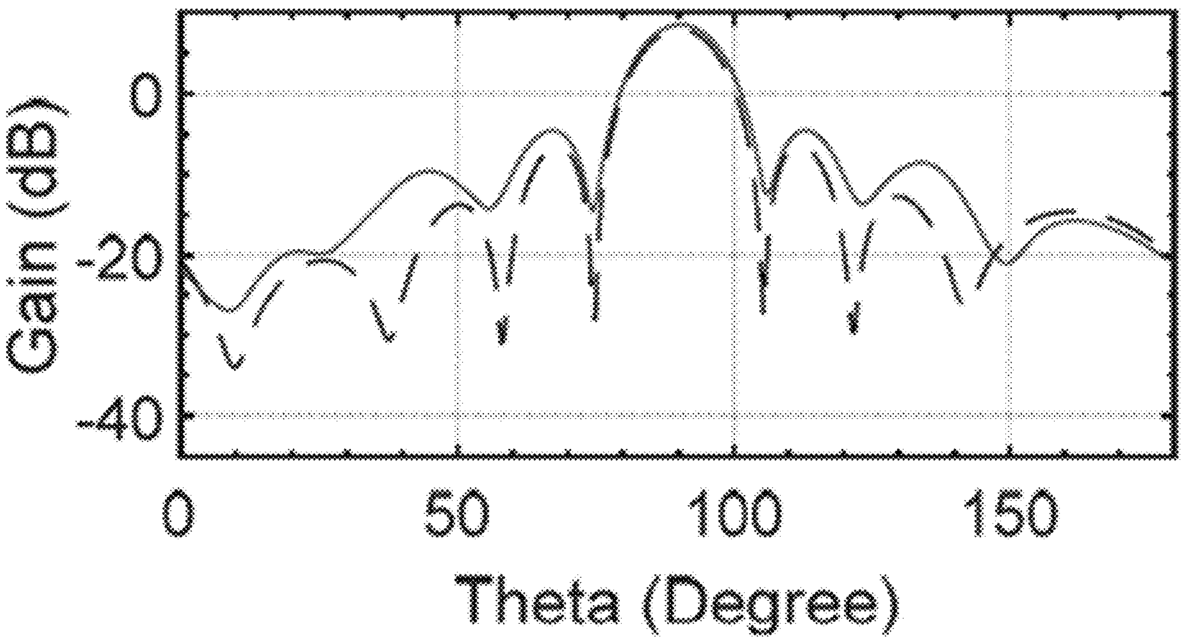

Due to the center-fed design, both antennas have a stable omnidirectional broadside radiation pattern. The computed realized gain of both classical and proposed wideband center-fed CoCo antennas is about 9.1 dBi. However, as shown in FIG. 5, the gain of the proposed antenna shows more stable behavior versus frequency. FIG. 5 illustrates the gain at broadside (θ=90°, ϕ=0°) as a function of frequency for the 8-section classical and wideband center-fed coaxial collinear antennas. The gain bandwidth (1 dB variation of the maximum gain versus frequency) of the wideband antenna is about 51.2 MHz, which is also approximately three times broader than the classical center-fed CoCo, which is similar to the impedance bandwidth. Also, the 3 dB variation of the maximum gain versus frequency of the wideband center-fed antenna is about 98 MHz (20.9%). FIGS. 6A-6D display the radiation patterns of both antennas at four different frequencies. The radiation pattern of the 8-section classical (dash line) and wideband (solid line) center-fed coaxial collinear antennas as a function of theta (θ) in ϕ=0° 450 MHz (FIG. 6A), 460 MHz (FIG. 6B), 470 MHz (FIG. 6C), and 480 MHz (FIG. 6D). Similar radiation pattern at their center frequencies (470 MHz) indicates that the wire mesh around the dipole did not disturb the radiation pattern of the wideband antenna. For instance, the half power beam width (HPBW) in E-plane at 470 MHz is 13.6° and 14.0° for the classical and wideband center-fed CoCo antennas, respectively. Comparison of the 450-MHz radiation pattern confirms the broader bandwidth of the wideband CoCo antenna, as mentioned in FIG. 5.

Figure 7:
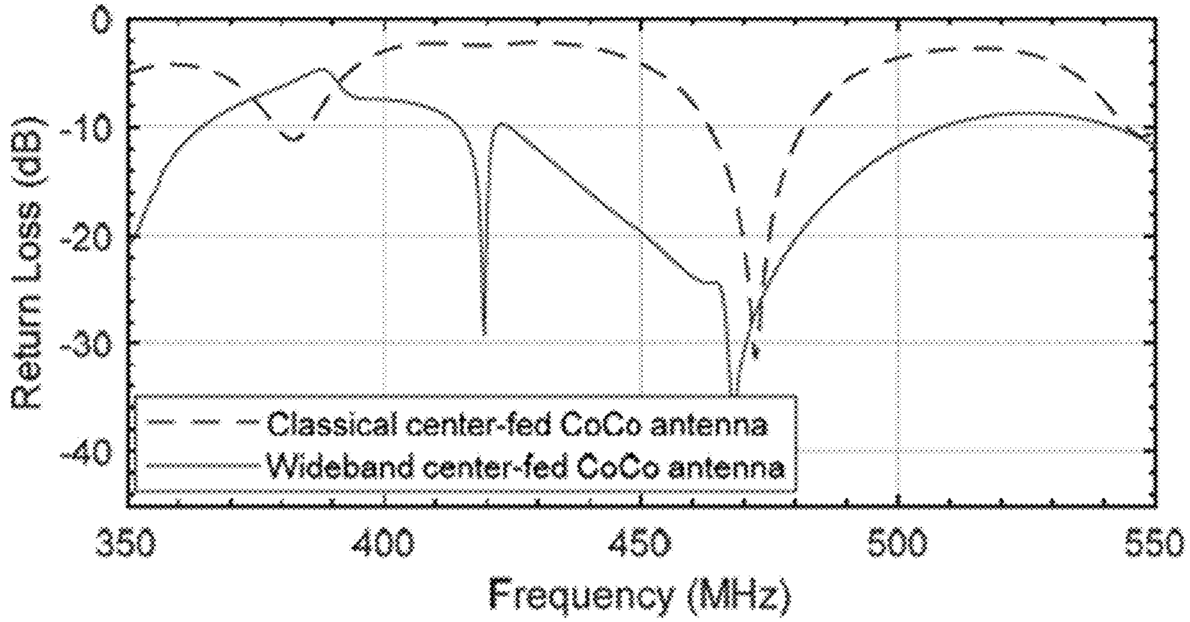
FIG. 7 is a graph of a return loss of a twelve-section classical antenna and a wideband center-fed coaxial collinear antenna.

Next, a twelve section center-fed CoCo antenna was simulated. The same technique was used to simulate the twelve-section classical and wideband center-fed CoCo antennas. Polyethylene was used as a dielectric to reduce the guided wavelength and the corresponding dimensions. So, the value of D just increases to 140 mm to keep the length of rods around half-wavelength. The number of segments in the polyethylene-filled coaxial cable CoCo antenna is more than an air-filled one to achieve the same gain, which can be due to the smaller guided wavelength. The computed return loss for classical and proposed center-fed CoCo are shown in FIG. 7. A 17Ω port has been used to better compare bandwidth instead of a regular 50Ω port for the proposed CoCo. The twelve-section classical center-fed CoCo has 3.9% impedance bandwidth, while the bandwidth of the proposed center-fed antenna is 18.0% (424.1-508.6 MHz), showing approximately five times greater bandwidth and confirming the results in section A.

Figure 8:
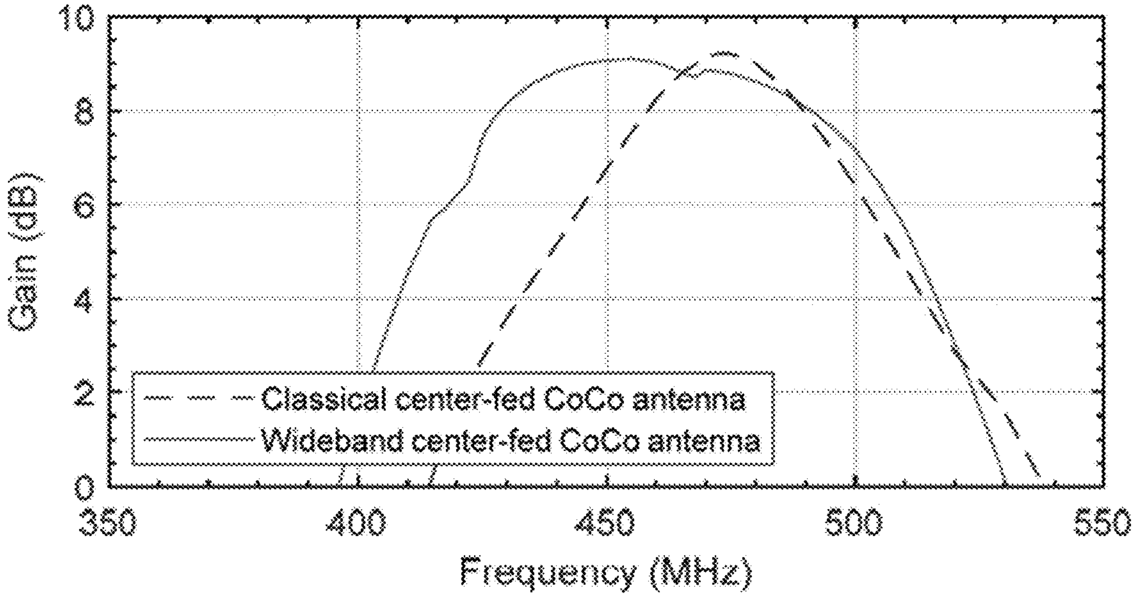
FIG. 8 is a graph of gain at broadside as a function of frequency for a twelve-section classical antenna and a wideband center-fed coaxial collinear antenna, according to one embodiment described herein.
Figure 9A:
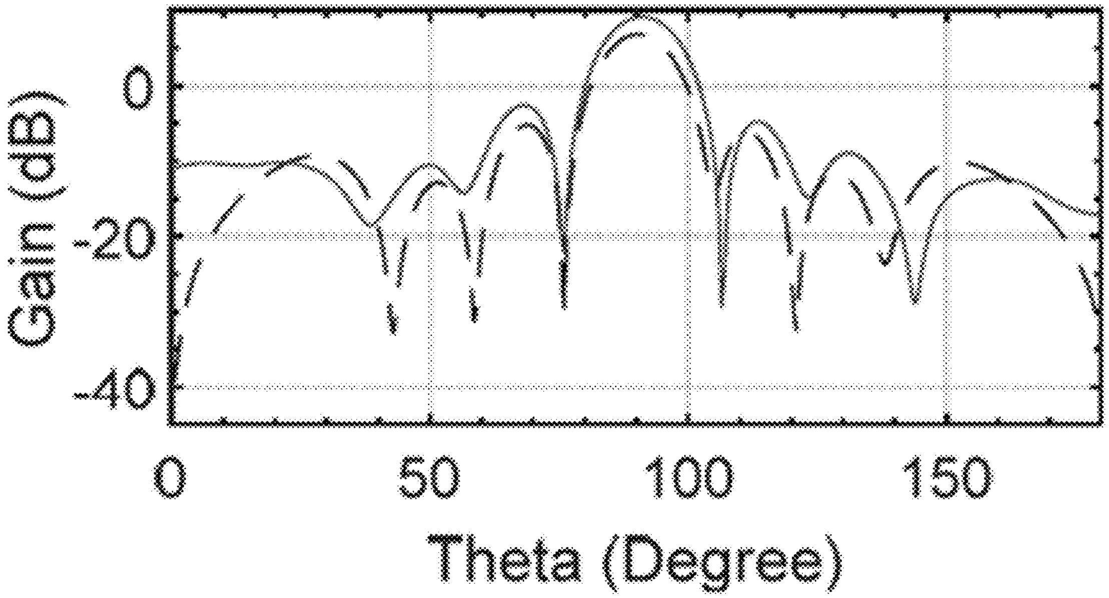
FIGS. 9A-9D are graphs of radiation patterns of a twelve section classical antenna and a wideband center-fed coaxial collinear antenna as a function of theta, according to one embodiment described herein.
Figure 9B:
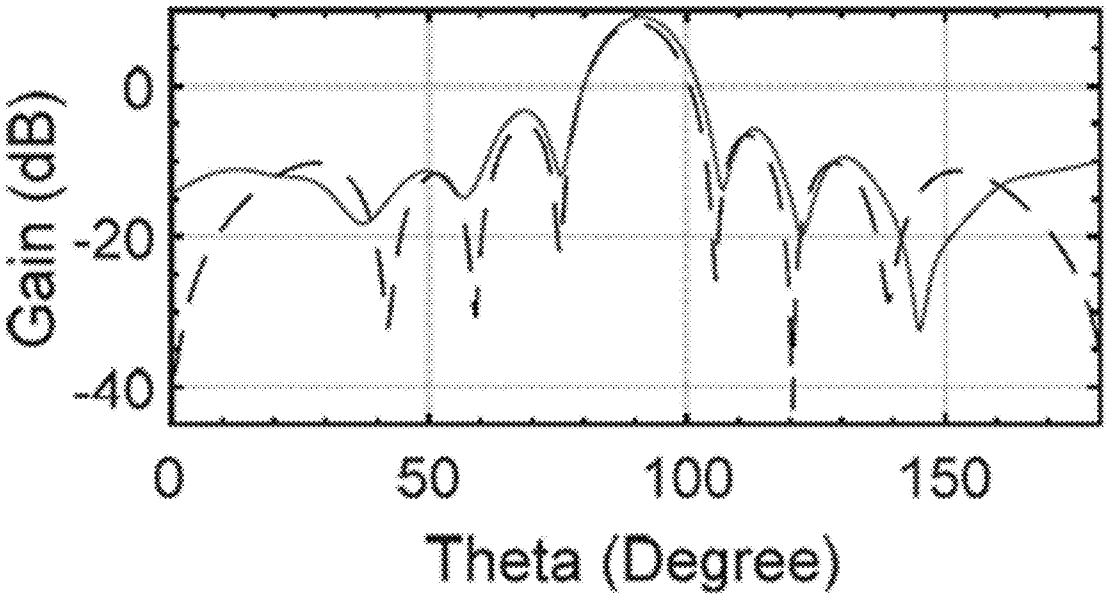
Figure 9C:
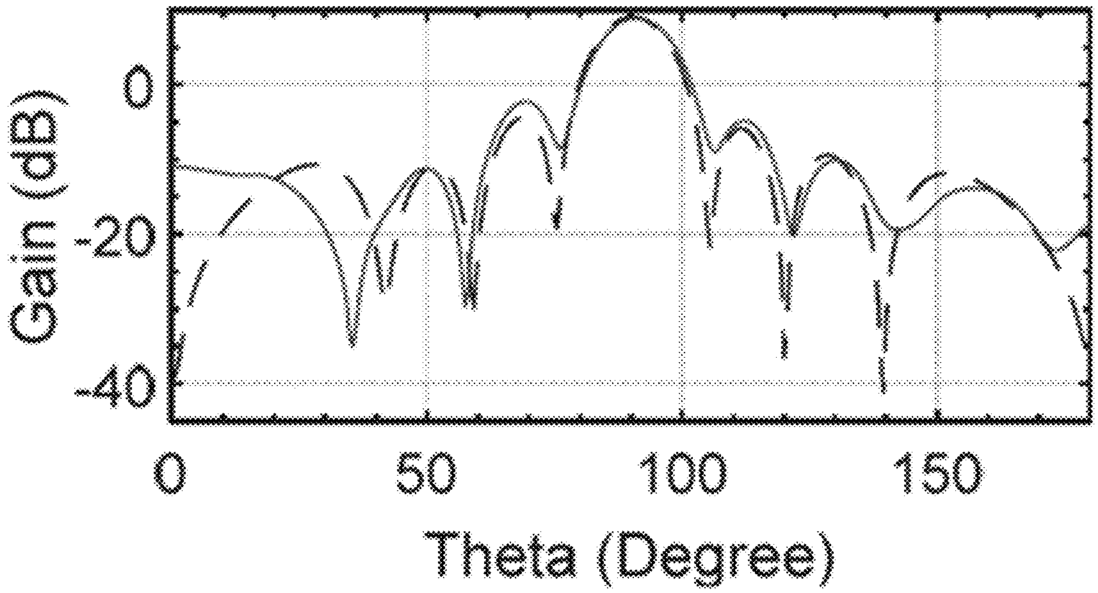
Figure 9D:
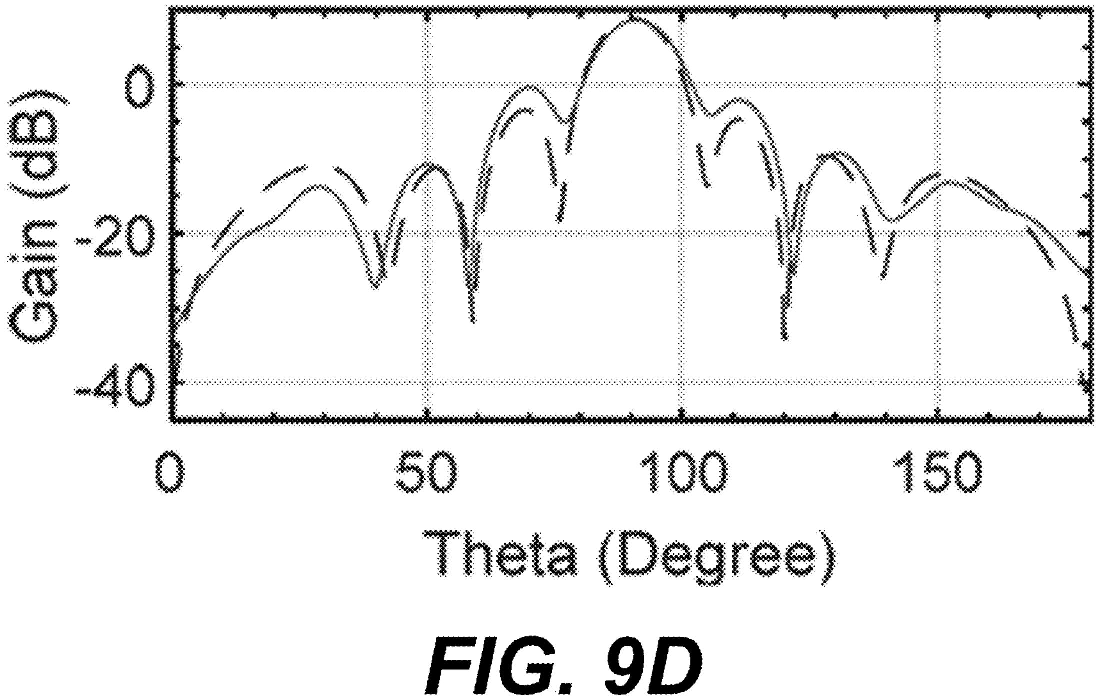

FIG. 8 and FIGS. 9A-9D show that both antennas have a stable omnidirectional radiation pattern. FIG. 8 illustrates graphs of gain at broadside (θ=90°, ϕ=0°) as a function of frequency for the 12-section classical coaxial collinear antennas and wideband center-fed CoCo antenna. In some embodiments, the wideband CoCo antenna 100 may omit the end-fed port. With regard to FIGS. 9A-9D, the radiation pattern of the 12-section classical (dash line) and wideband (solid line) center-fed coaxial collinear antennas are shown as a function of theta (θ) in ϕ=0° at 450 MHz (FIG. 9A), at 460 MHz (FIG. 9B), at 470 MHz (FIG. 9C), and at 480 MHz (FIG. 9D).

The realized gain of the classical CoCo and the wideband antenna is about 9.2 dBi and 9.1 dBi, respectively. The gain bandwidth of the 12-section wideband antenna is about 59.8 MHz, which is also approximately three times broader than the classical center-fed CoCo. The 3 dB variation of the maximum gain versus frequency of the proposed antenna at broadside is about 87.5 MHz (18.6%). Note that the outside of the gain bandwidth, the gain is still around 9 dB, but it is not completely omnidirectional, and there is about 2 dB variation over the broadside direction (θ=90°, ϕ is variable). Also, the similar radiation pattern at the center frequency (470 MHz) of both antennas and the comparison of radiation patterns at different frequencies indicate that the added wire mesh structure produces a wider antenna without any distortion in the radiation pattern. The calculated HPBW is 13.0° and 13.4° at 470 MHz for the 12-section classical and wideband center-fed CoCo antennas, respectively.

When comparing the eight-section wideband center-fed CoCo antenna with air-filled cable and the twelve-section wideband center-fed CoCo antenna using RG8A/U cable, both antennas have the same length (2.5 m), and same realized gain (around 9.1 dBi), and their bandwidth is approximately three times broader than the corresponding classical Coco antenna. Although for the twelve-section wideband center-fed CoCo, both computed bandwidths (impedance and gain bandwidth) are more than 10% (18.0% and 12.7%, respectively). The gain bandwidth is just more than 10% for the 8-section proposed center-fed CoCo. Due to the effect of guided wavelength, more segments are needed to reach 9 dBi gain by using the regular coaxial. Note that the gain of a CoCo antenna increases by increasing the number of sections (e.g. segments). Its impedance bandwidth decreases by increasing its gain while using coaxial cable with polyethylene dielectric helps to keep the gain and bandwidth of the twelve-section CoCo antenna similar to eight-section CoCo antenna. Since adding the wire mesh structure reduces the input impedance, using air-filled cable only helps to choose the input impedance freely for better matching. In other cases, using commercial coaxial cables is recommended.

Figure 10:
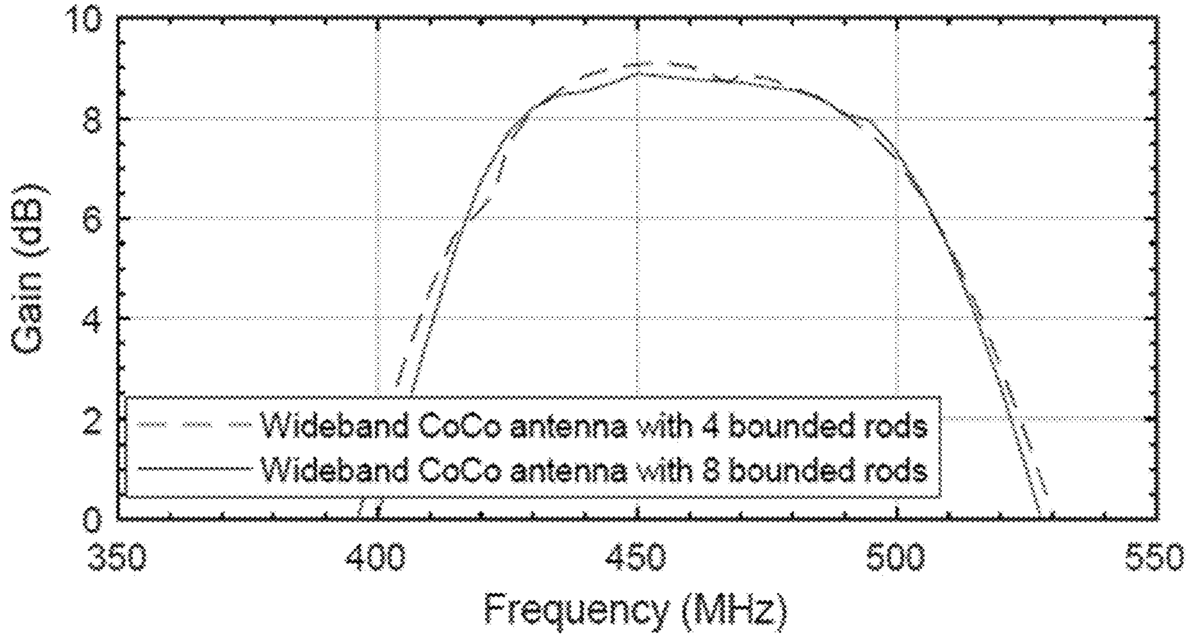
FIG. 10 is a graph of gain at broadside as a function of frequency for the twelve section wideband center-fed coaxial collinear antenna with four and eight bounded rods, according to one embodiment described herein.

Additionally, the simulation shows that using the dimensions of RG-218 coaxial cables instead of RG8A/U coaxial cable does not change the performance of the antenna. Further, the wire mesh structure configuration with eight bounded rods attached to each dipole is simulated to evaluate the effect of the number of rods. As shown in FIG. 10, the performance does not change significantly, and four bounded rods have sufficient impact on bandwidth increase. FIG. 10 illustrates graphs of gain at broadside (θ=90°, ϕ=0°) as a function of frequency for the 12-section wideband center-fed coaxial collinear antennas with 4 and 8 bounded rods.

Figure 14A:
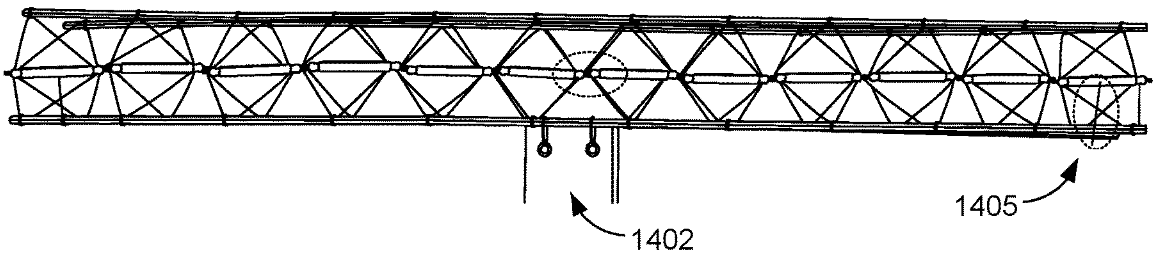
FIGS. 14A-14C illustrates different components of a prototype wideband end-fed coaxial collinear antenna, according to one embodiment described herein.

Next, a twelve section end-fed CoCo antenna was simulated. Although the requirement for the wideband antenna with a narrower beam (9 dBi gain with omnidirectional pattern) is satisfied with the proposed center-fed CoCo antenna, the end-fed CoCo antenna is desired to be mounted on a buoy. Thus, this end-fed CoCo antenna should omit beamscan radiation pattern and have a similar characteristic to the center-fed one. As mentioned in previously, the semi-rigid cable can used to excite (i.e. providing current) the antenna in its center while acting in the lower part of the antenna similar to the inner conductor removed from the main coaxial cable. The simulation for the twelve section center-fed CoCo antenna showed that the simulated input impedance of the wideband antenna is about 17Ω in the center of the antenna. Thus, a matching circuit (e.g. an impedance matching circuit) can be used to connect the 17Ω impedance of the center of the antenna to the 50Ω impedance of the semi-rigid cable. In one embodiment, the impedance matching circuit is a quarter-wavelength coaxial transformer (e.g. an impedance transformer). So, the quarter-wavelength coaxial transformer is added between the center and semi-rigid cable, as shown in FIG. 14A. It should be noted that other impedance matching circuits can be used. In the illustrated embodiment, the length of this transformer is about 97 mm length with the same outer diameter as semi-rigid, but the diameter of the inner conductor is increased to make the 30Ω transformer.

Figure 11:
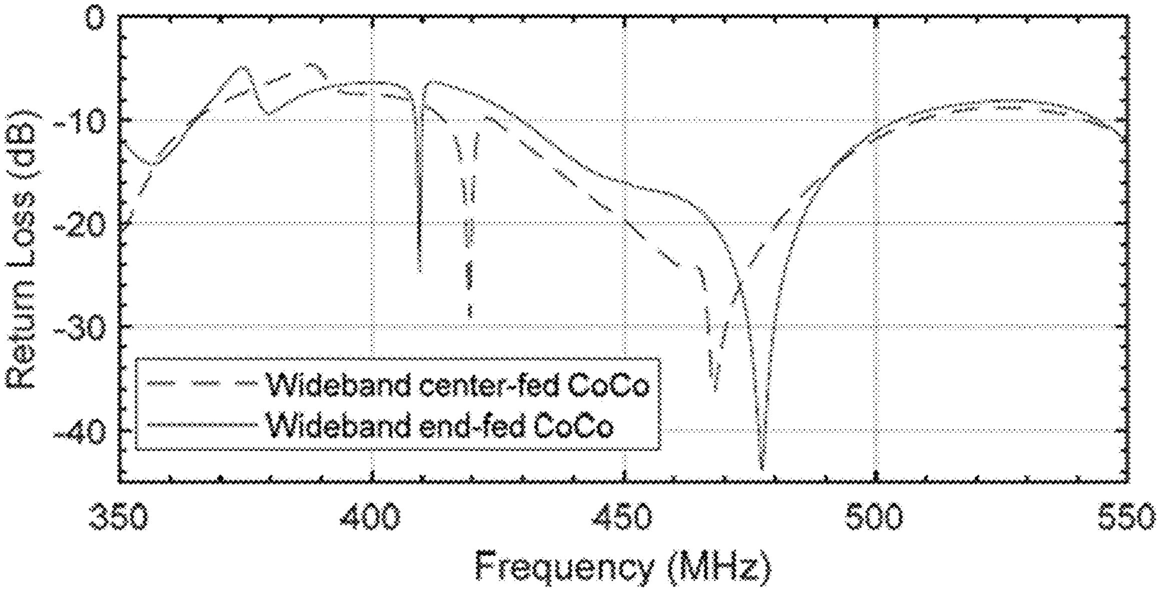
FIG. 11 is a graph of return loss of the twelve-section wideband center-fed and end-fed coaxial collinear antennas, according to one embodiment described herein.

As shown in FIG. 11, the computed return loss of the twelve-section wideband end-fed CoCo antenna is compared with wideband center-fed CoCo. The end-fed CoCo antenna has 15.9% (429.6-504.5 MHz) impedance bandwidth, compared to 18% impedance bandwidth of center-fed one. The realized gain of the twelve-section wideband end-fed CoCo is about 9.0 dBi, which does not change significantly from the center-fed antenna.

Figure 12:
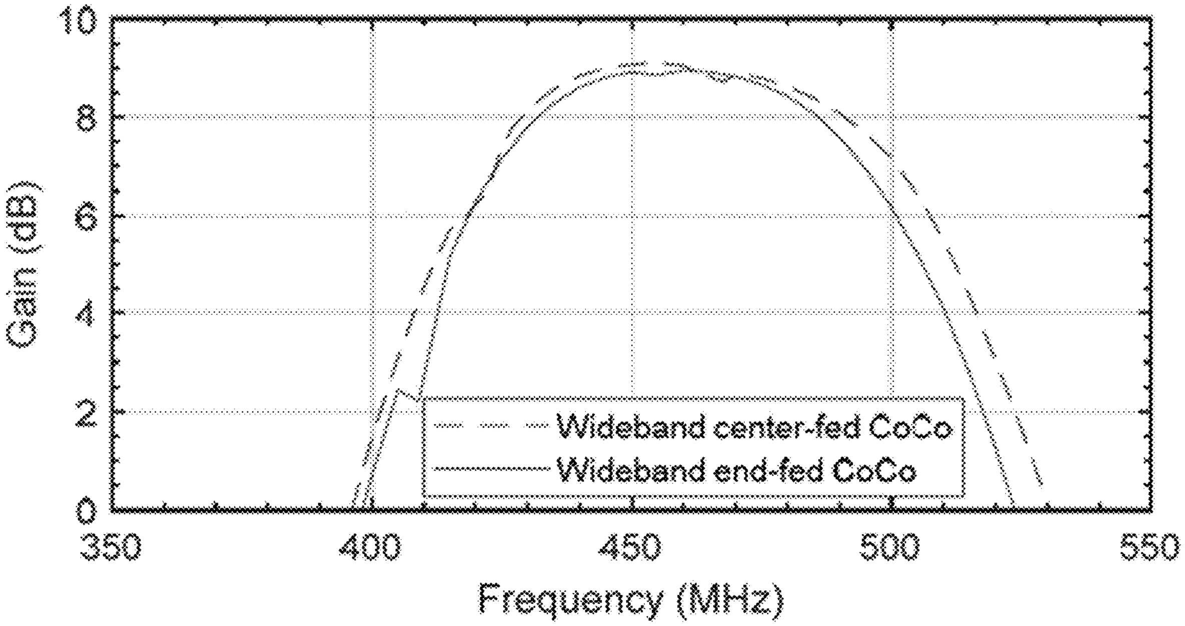
FIG. 12 is a graph of gain at broadside as a function of frequency for the twelve-section wideband center-fed and end-fed coaxial collinear antennas, according to one embodiment described herein.

FIG. 12 shows that the gain bandwidth of the twelve-section wideband end-fed antenna is about 54.7 MHz. FIG. 12 illustrates graphs of gain at broadside (θ=90°, ϕ=0°) as a function of frequency for the 12-section wideband center-fed and end-fed coaxial collinear antennas. The simulation results indicate that while the impedance bandwidth of the end-fed antenna decreased compared to the center-fed one, the gain bandwidth of the end-fed is still similar to the center-fed antenna.

Figure 13A:
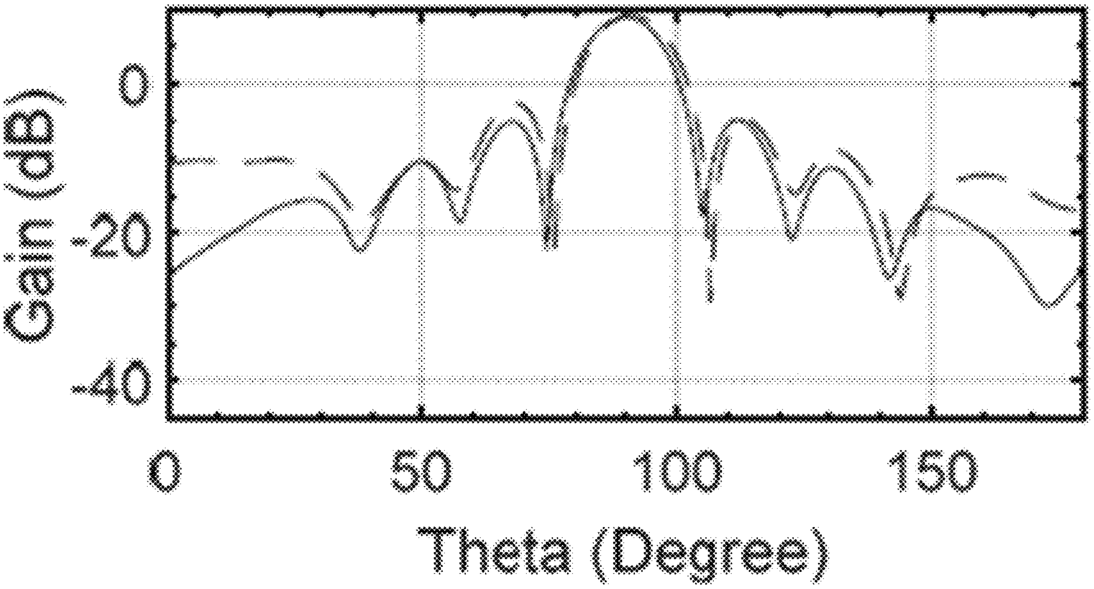
FIGS. 13A-13D are graphs of radiation patterns of a twelve section classical and wideband center-fed coaxial collinear antennas as a function of theta, according to one embodiment described herein.
Figure 13B:
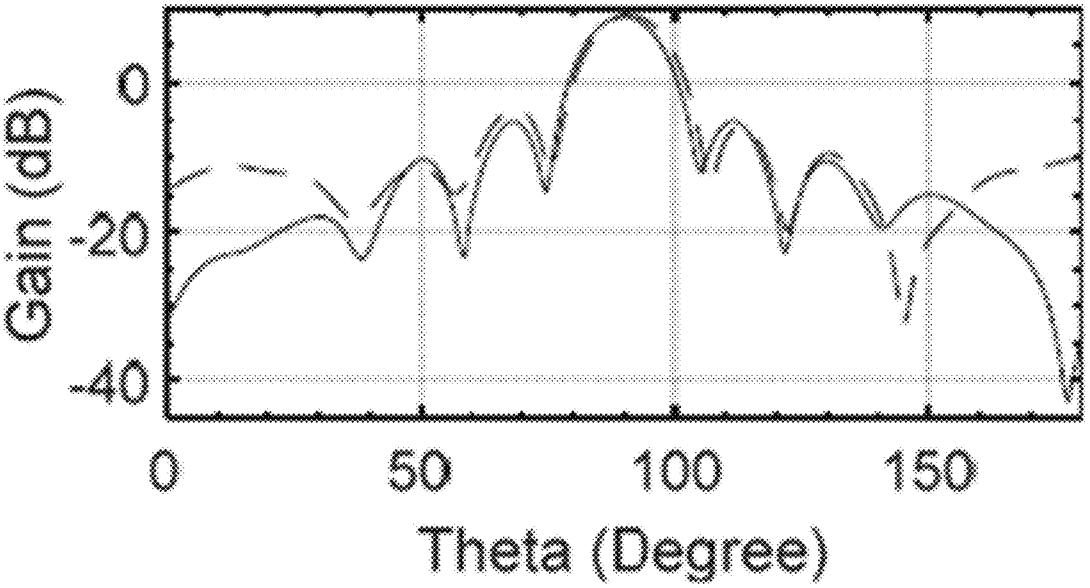
Figure 13C:
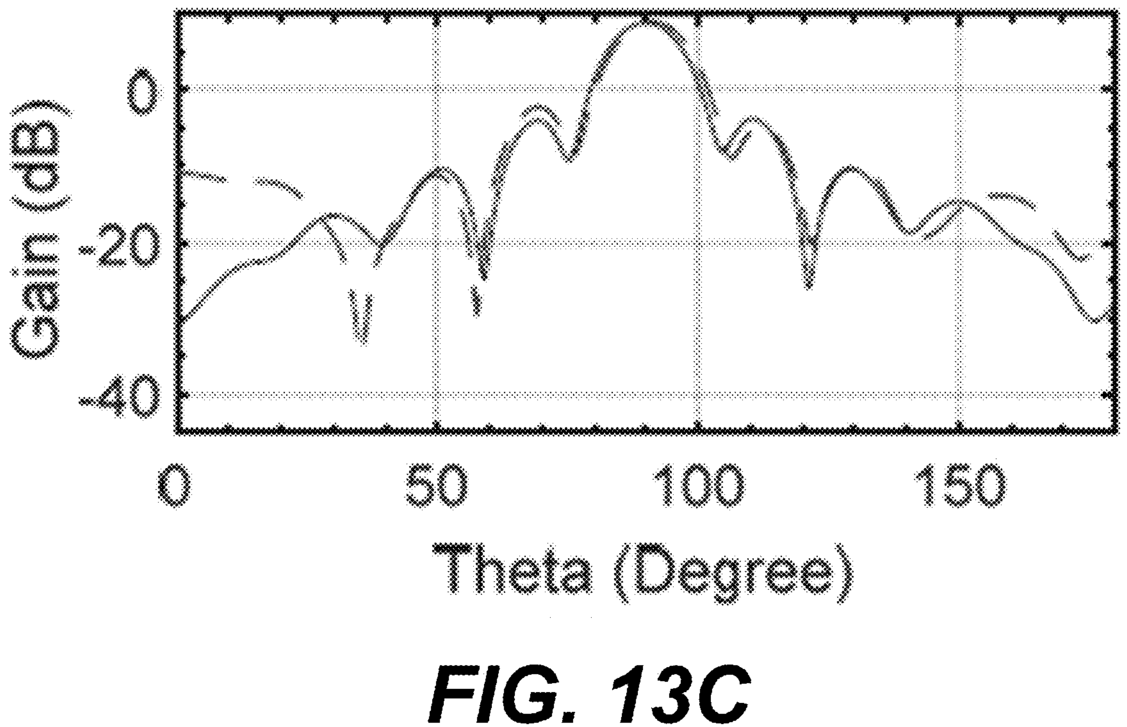
Figure 13D:
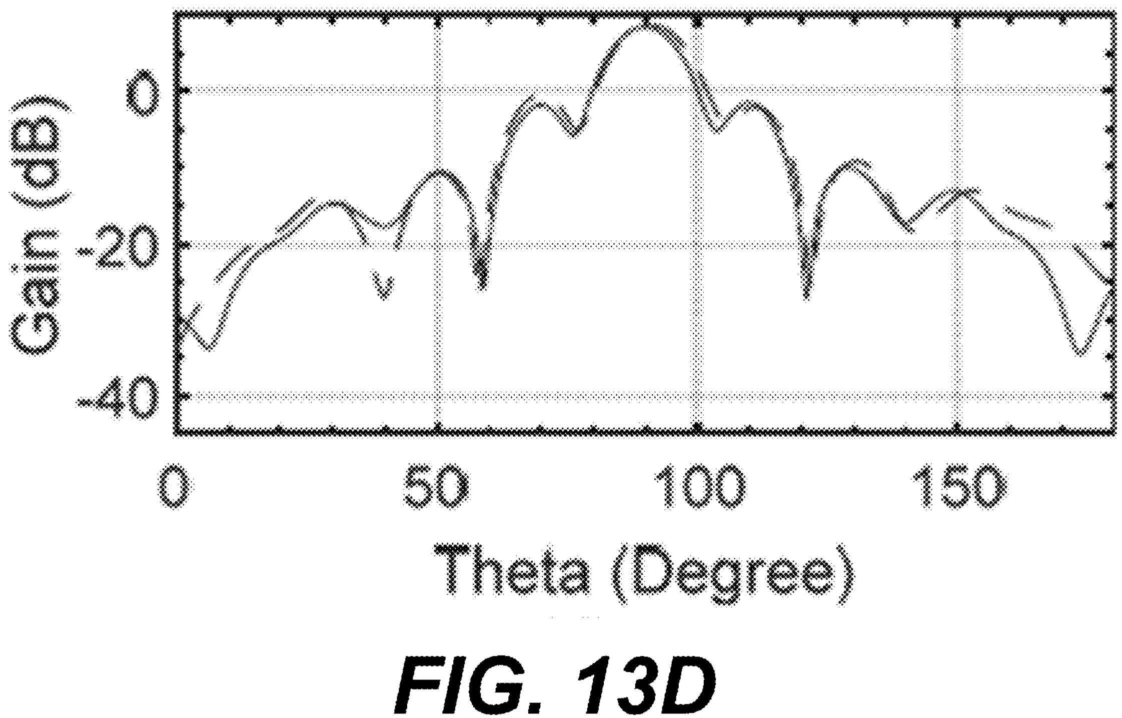

Typically, the quality of the impedance matching is used to determine the bandwidth of antennas. However, the stability of radiation patterns can be included in the bandwidth improvement approach, and gain bandwidth can play a role in determining the performance of the antenna. The impedance bandwidth in the wideband center-fed antenna is more than the gain bandwidth, but the realistic functionality of the antenna is the gain bandwidth. After modifying the antenna to include end-fed implementation, these bandwidth values come close to each other, which is similar to the gain bandwidth of the center-fed design. As such, this means the performance of the wideband antenna does not change significantly. FIGS. 13A-13D illustrate graphs of the radiation pattern of the 12-section wideband center-fed (dash line) and end-fed (solid line) coaxial collinear antennas as a function of theta (θ) in ϕ=0° (a) 450 MHz (FIG. 13A), at 460 MHz (FIG. 13B), at 470 MHz (FIG. 13C), and at 480 MHz (FIG. 13D).

Figure 14B:
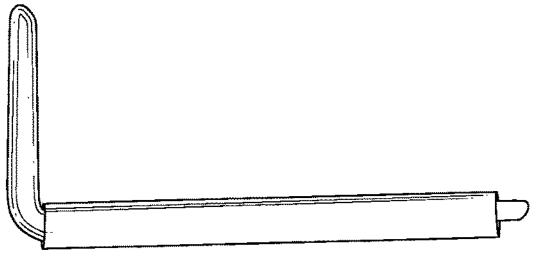
Figure 14C:
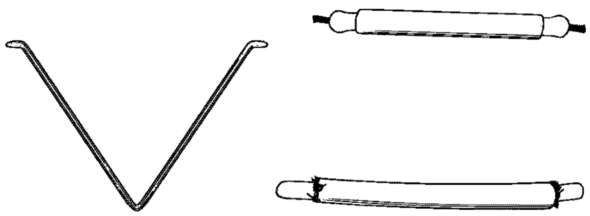
Figure 15:
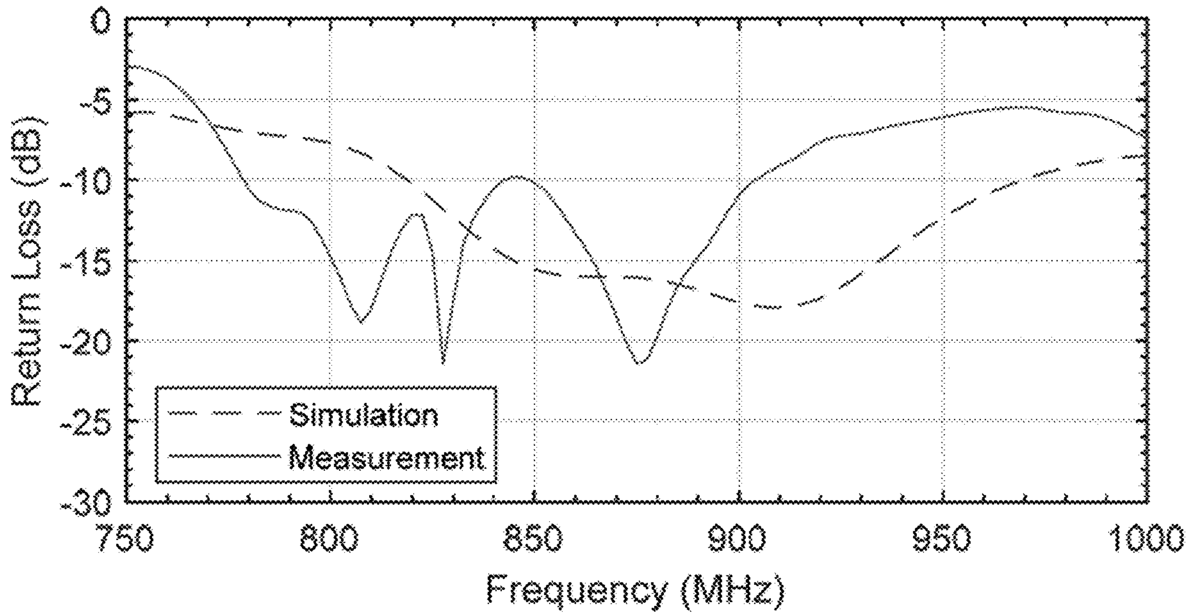
FIG. 15 is a graph of a simulated and measured return of loss of the twelve section wideband end-fed coaxial antenna, according to one embodiment described herein.

Next, the measurement results are discussed. The embodiments of the wideband end-fed coaxial collinear antenna have been prototyped and measured for 900 MHz based on measurement considerations. FIGS. 14A-14C illustrate a prototype of the wideband antenna with an impedance transformer 1402 used for impedance matching. FIG. 14A illustrates a prototyped of the 12-section wideband end-fed coaxial collinear antenna. FIG. 14A illustrates the impedance transformer 1402 and the end feeding port 1405. FIG. 14B illustrates an impedance transformer, and FIG. 14C illustrates primary antenna components. The same design procedure follows for simulation of the CoCo antenna at 900 MHz. As depicted in FIG. 15, the simulated and measured return loss of the prototype antenna are shown. It is seen that the operating frequency of the prototype antenna is shifted down relative to the simulation, though the measured impedance bandwidth is around 125.5 MHz (14.9%), which agrees well with 16.9% impedance bandwidth of the simulated one.

Figure 16A:
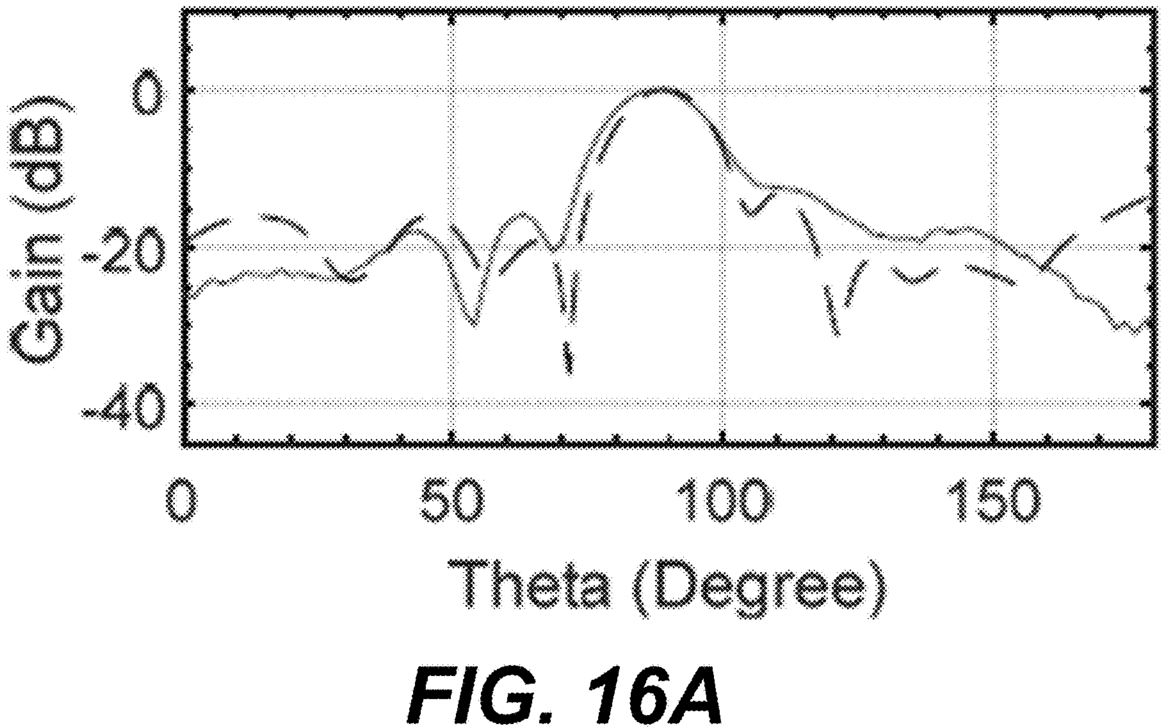
FIGS. 16A-16D are graphs of a simulated and measured radiation pattern of the twelve-section wideband end-fed coaxial collinear antennas as a function of theta, according to one embodiment described herein.
Figure 16B:
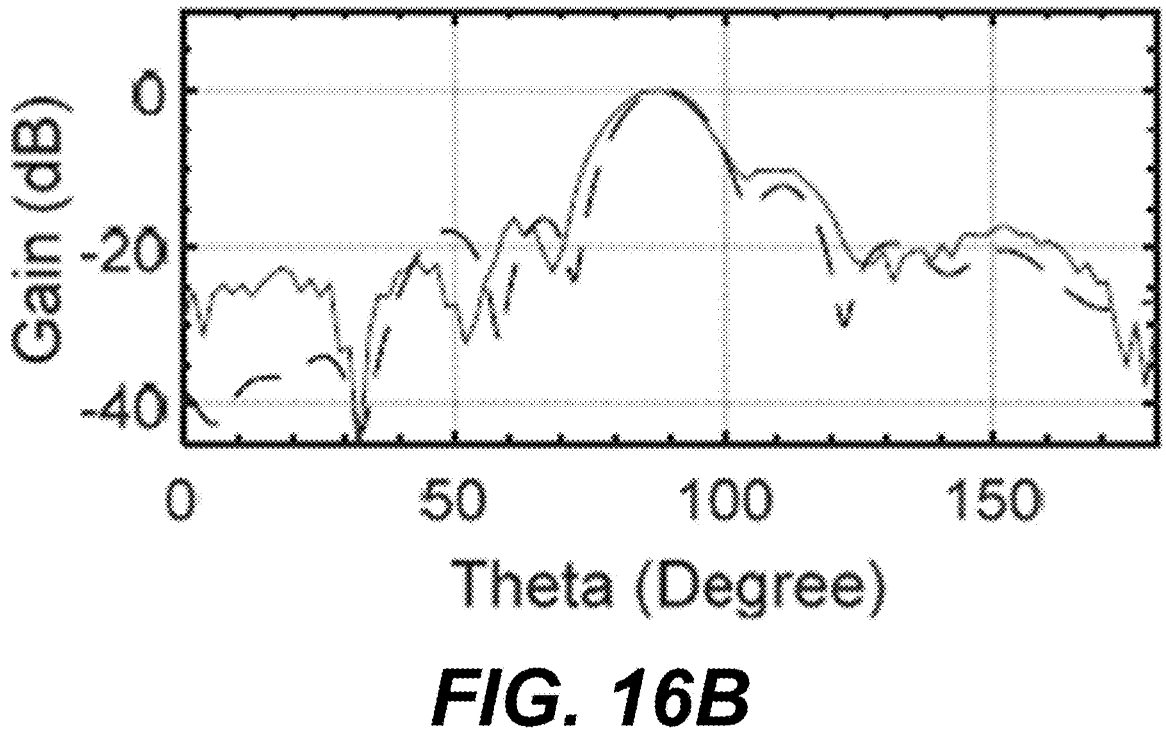
Figure 16C:
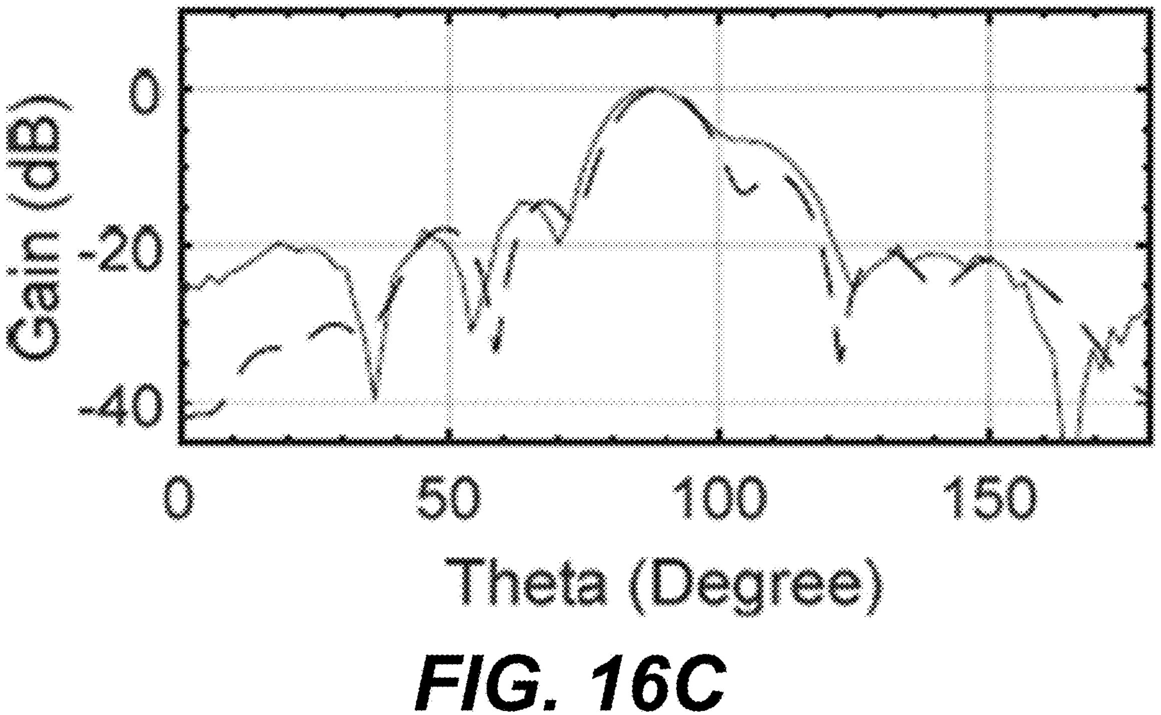
Figure 16D:
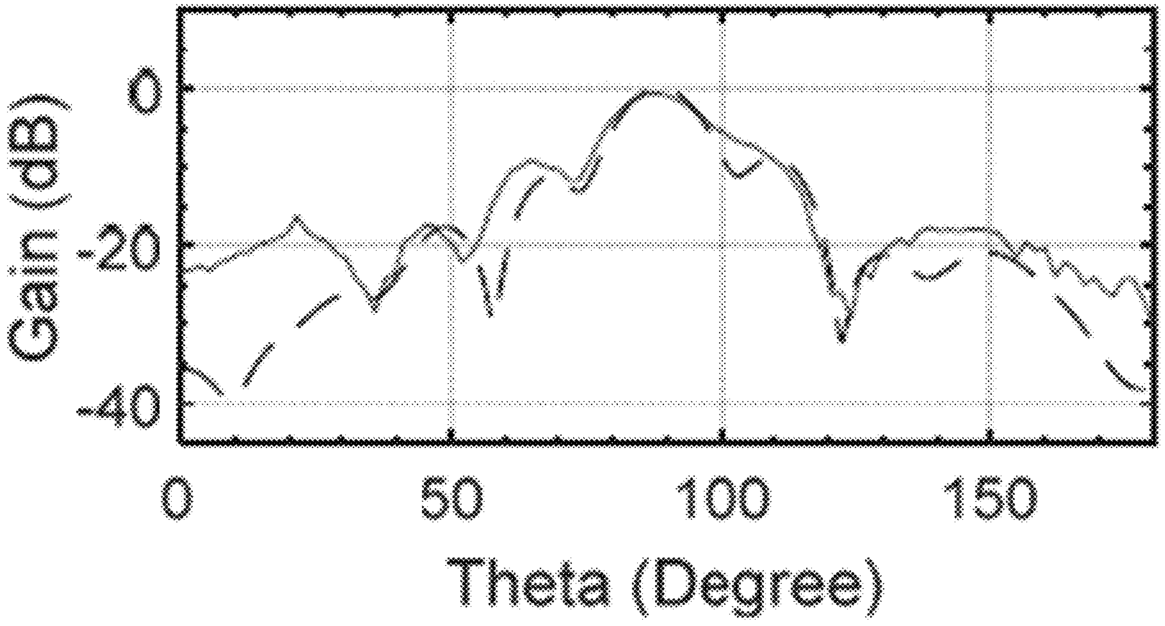

FIGS. 16A-16D illustrate the measured patterns at four different frequencies. The simulated (dash line) and measured (solid line) radiation pattern of the 12-section wideband end-fed coaxial collinear antennas as a function of theta (θ) in ϕ=0° at 840 MHz (FIG. 16A), at 860 MHz (FIG. 16B), at 880 MHz (FIG. 16C), and 900 MHz (FIG. 16D). In FIGS. 16A-16D, the graphs illustrate the improved performance of the wideband end-fed prototype antenna over previous CoCo antenna designs. Particularly, this wideband end-fed antenna has a stable omnidirectional broadside radiation pattern. Note that the distortion in the measured radiation pattern for θ>90° is related to the coaxial cable connecting the antenna to the measurement setup in the anechoic chamber when the antenna was rotated horizontally during measurement. In practice, the antenna can be used in vertical orientation and there is no effect on radiation pattern owing to the source transmission line.

Figure 17:
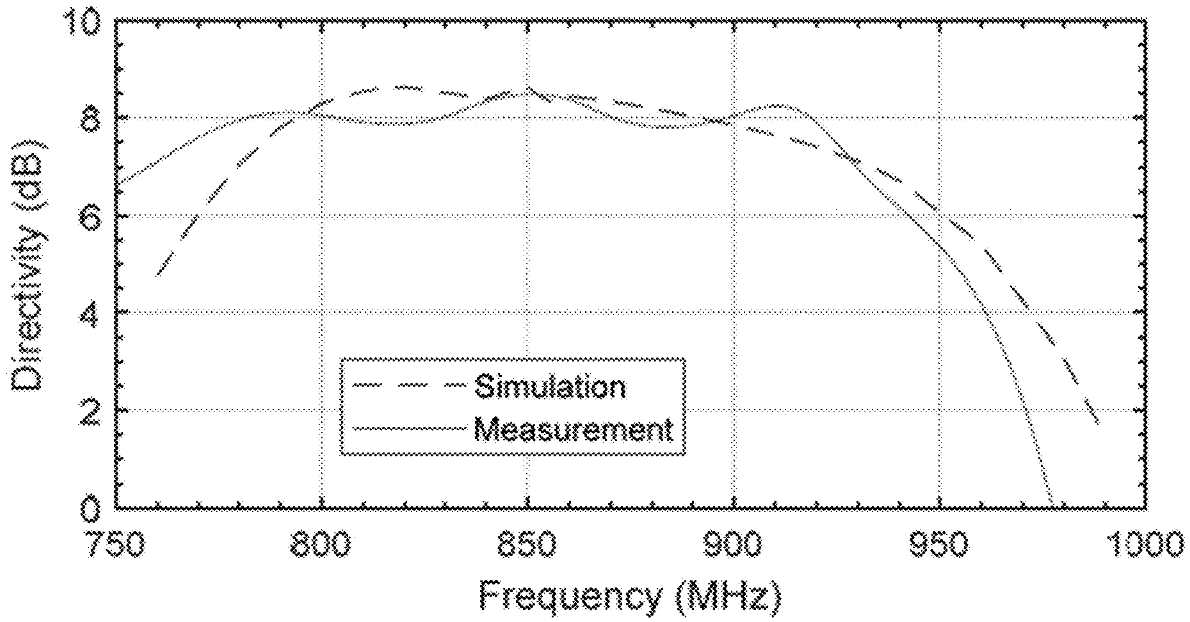
FIG. 17 is a graph of a simulated and measured directivity at broadside of the twelve-section wideband end-fed coaxial collinear antennas as a function of frequency, according to one embodiment described herein.

The measured pattern shows that Half Power Beamwidth (HPBW) of the antenna is varied between 14° and 16° over the operating frequency range. Moreover, FIG. 17 displays the variation of the directivity of the prototype antenna compared to the simulated one. Similar to the return loss, the antenna's operating frequency is shifted down, but the measurement reveals around 8 dBi directivity over the frequency, and the directivity bandwidth (1 dB variation of the maximum directivity versus frequency) of the prototype antenna is about 14.8%, which is similar to the impedance bandwidth. In FIG. 17, the simulated and measured directivity are shown at broadside (θ=90°, ϕ=0°) as a function of frequency for the 12-section wideband end-fed coaxial collinear antenna.

Overall, the embodiments include a wideband CoCo antenna 100 that increases the bandwidth of the antenna. The simulation results show that the impedance bandwidth has been improved by 300% while maintaining a stable gain and radiation pattern over a wide frequency band. The prototyped antenna at 900 MHz demonstrates 14.8% impedance bandwidth and gain bandwidth Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A coaxial collinear antenna, comprising:

a first segment of a coaxial cable for the coaxial collinear antenna, wherein the first segment comprises a first inner conductor and a first outer conductor;

a second segment of the coaxial cable for the coaxial collinear antenna, wherein the second segment comprises a second inner conductor and a second outer conductor, wherein the first inner conductor of the first segment is electrically coupled to the second outer conductor of the second segment, and the first outer conductor of the first segment is electrically coupled to the second inner conductor of the second segment;

a first wire mesh that is attached to the first outer conductor of the first segment;

a second wire mesh that is attached to the second outer conductor of the second segment; and an end-fed port situated at a distal end of the coaxial collinear antenna, wherein at least one of the first wire mesh and the second wire mesh comprises a plurality of rods.

2. The coaxial collinear antenna of claim 1, wherein the first wire mesh for the first segment comprises a first pair of rods and the second wire mesh of the second segment comprises a second pair of rods, wherein the first pair of rods and the second pair of rods are aligned.

3. The coaxial collinear antenna of claim 1, further comprising an electrically-conductive cable inserted through the end-fed port and through one segment of the coaxial cable.

4. The coaxial collinear antenna of claim 3, wherein the electrically conductive cable has a smaller diameter than the coaxial cable.

5. The coaxial collinear antenna of claim 3, wherein the electrically conductive cable is coupled to an impedance matching circuit.

6. The coaxial collinear antenna of claim 3, further comprising:

an impedance matching circuit that connects to the electrically conductive cable, wherein the impedance matching circuit is coupled to a respective inner conductor and a respective outer conductor of one segment of the coaxial cable.

7. The coaxial collinear antenna of claim 1, wherein the first wire mesh comprises:

a first rod that is attached to the first outer conductor of the first segment;

a second rod that is attached to the first outer conductor of the first segment;

a third rod that is attached to the first outer conductor of the first segment; and a fourth rod that is attached to the first outer conductor of the first segment.

8. The coaxial collinear antenna of claim 1, wherein the end-fed port is located in a respective segment of the coaxial cable at a distance of a quarter-wavelength from an interconnection with a preceding segment.

9. The coaxial collinear antenna of claim 8, further comprising an electrically-conductive cable that is inserted through an interior of one segment and routed outside of the preceding segment of the coaxial cable.

10. The coaxial collinear antenna of claim 8, wherein the preceding segment is a length of a half-wavelength.

11. The coaxial collinear antenna of claim 1, wherein the distal end represents a first distal end for the end-fed port, and the coaxial collinear antenna further comprises:

a last segment of the coaxial cable short-circuited at a second distal end of the coaxial collinear antenna.

12. A coaxial collinear antenna, comprising:

a first segment of a coaxial cable for the coaxial collinear antenna, wherein the first segment comprises a first inner conductor and a first outer conductor;

a second segment of the coaxial cable for the coaxial collinear antenna, wherein the second segment comprises a second inner conductor and a second outer conductor, wherein the first inner conductor of the first segment is electrically coupled to the second outer conductor of the second segment, and the first outer conductor of the first segment is electrically coupled to the second inner conductor of the second segment;

a first wire mesh that is attached to the first outer conductor of the first segment;

a second wire mesh that is attached to the second outer conductor of the second segment; and an end-fed port situated at a distal end of the coaxial collinear antenna, wherein the first wire mesh comprises:

a first rod that is attached to the first outer conductor of the first segment; and a second rod that is attached to the first outer conductor of the first segment.

13. The coaxial collinear antenna of claim 12, wherein the first rod and the second rod are diametrically opposite about the first outer conductor of the first segment.

14. The coaxial collinear antenna of claim 12, wherein a length of the first rod is determined based at least in part on half of an operating wavelength of the coaxial collinear antenna.

15. A coaxial collinear antenna apparatus, comprising:

a first segment of a coaxial cable for a coaxial collinear antenna, wherein the first segment comprises a first inner conductor and a first outer conductor;

a second segment of the coaxial cable for the coaxial collinear antenna, wherein the second segment comprises a second inner conductor and a second outer conductor, wherein the first inner conductor of the first segment is electrically coupled to the second outer conductor of the second segment, and the first outer conductor of the first segment is electrically coupled to the second inner conductor of the second segment;

a first wire mesh that is attached to the first outer conductor of the first segment, wherein the first wire mesh comprises a first plurality of rods;

a second wire mesh that is attached to the second outer conductor of the second segment, wherein the second wire mesh comprises a second plurality of rods;

an end-fed port situated in a particular segment of the coaxial cable, wherein the particular segment is located at a distal end of the coaxial cable; and an electrically conductive cable that is inserted through the end-fed port and into an interior of a third segment of the coaxial cable.

16. The coaxial collinear antenna apparatus of claim 15, wherein the electrically conductive cable has a smaller diameter than the coaxial cable.

17. The coaxial collinear antenna apparatus of claim 15, wherein the electrically conductive cable is coupled to an impedance matching circuit.

18. The coaxial collinear antenna apparatus of claim 15, wherein at least one of the first plurality of rods or the second plurality of rods comprises a bend.

19. The coaxial collinear antenna apparatus of claim 15, wherein the first plurality of rods are coupled to the first outer conductor of the first segment of the coaxial cable.

* * * * *